United States Patent
Shimada et al.

(10) Patent No.: US 9,002,176 B2
(45) Date of Patent: *Apr. 7, 2015

(54) RECORDING MEDIUM, REPRODUCING APPARATUS, AND REPRODUCING METHOD

(71) Applicant: Mitsubishi Electric Corporation, Tokyo (JP)

(72) Inventors: Masaaki Shimada, Tokyo (JP); Tomoaki Ryu, Tokyo (JP); Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,264

(22) Filed: Aug. 5, 2014

(65) Prior Publication Data

US 2014/0355964 A1    Dec. 4, 2014

Related U.S. Application Data

(62) Division of application No. 14/269,908, filed on May 5, 2014, which is a division of application No. 14/132,433, filed on Dec. 18, 2013, which is a division of application No. 13/158,964, filed on Jun. 13, 2011, (Continued)

(30) Foreign Application Priority Data

Aug. 10, 2005 (JP) .................................. 2005-232619

(51) Int. Cl.
    *H04N 9/80*    (2006.01)
    *G11B 27/30*   (2006.01)

(Continued)

(52) U.S. Cl.
    CPC ............ *G11B 27/3027* (2013.01); *G11B 20/10* (2013.01); *G11B 27/322* (2013.01);

(Continued)

(58) Field of Classification Search
    CPC .......... G11B 20/10; G11B 2220/2541; H04N 21/2387; H04N 21/42646; H04N 5/00
    See application file for complete search history.

(56) References Cited

U.S. PATENT DOCUMENTS 8,027,563 B2 *  9/2011  Shimada et al. ............... 386/241
8,639,090 B2 *  1/2014  Shimada et al. ............... 386/241

(Continued)

FOREIGN PATENT DOCUMENTS

EP    0 903 738 A    3/1999
EP    1566965 A1    8/2005

(Continued)

OTHER PUBLICATIONS

Extended European Search Report for corresponding Application No. 12197308.5 dated Feb. 7, 2013.

*Primary Examiner* — Huy T Nguyen
(74) *Attorney, Agent, or Firm* — Birch, Stewart, Kolasch & Birch, LLP

(57) ABSTRACT

In a recording medium on which is recorded a multiplexed stream including a plurality of first packets (V_main) constituting a first I-picture in a first video stream and a plurality of second packets (V_sub) constituting a second I-picture in a second video stream, information for identifying the first I-picture and information for identifying the second I-picture are recorded on the medium. A recording medium can thereby be obtained that enables the rapid detection, from a small amount of information, of a particular picture included in a stream such as a TS in which multiple content streams are multiplexed.

2 Claims, 19 Drawing Sheets

Related U.S. Application Data now Pat. No. 8,639,090, which is a division of application No. 11/665,621, filed as application No. PCT/JP2006/311292 on Jun. 6, 2006, now Pat. No. 8,027,563.

(51) Int. Cl.

| | | |
|---|---|---|
| *G11B 20/10* | (2006.01) | |
| *G11B 27/32* | (2006.01) | |
| *H04N 5/45* | (2011.01) | |
| *H04N 9/804* | (2006.01) | |
| *H04N 21/2368* | (2011.01) | |
| *H04N 21/2387* | (2011.01) | |
| *H04N 21/426* | (2011.01) | |
| *H04N 21/434* | (2011.01) | |
| *H04N 21/44* | (2011.01) | |
| *G11B 20/00* | (2006.01) | |
| *H04N 19/70* | (2014.01) | |
| *H04N 19/44* | (2014.01) | |
| *G11B 27/19* | (2006.01) | |
| *G11B 27/34* | (2006.01) | |
| *G11B 27/22* | (2006.01) | |
| *H04N 5/775* | (2006.01) | |
| *H04N 5/783* | (2006.01) | |
| *H04N 5/85* | (2006.01) | |
| *H04N 9/806* | (2006.01) | |
| *H04N 9/82* | (2006.01) | |

(52) U.S. Cl.
CPC ............... *G11B2020/10592* (2013.01); *G11B 2220/2541* (2013.01); *H04N 5/45* (2013.01); *H04N 5/775* (2013.01); *H04N 5/783* (2013.01); *H04N 5/85* (2013.01); *H04N 9/8042* (2013.01); *H04N 9/8063* (2013.01); *H04N 9/8205* (2013.01); *H04N 9/8227* (2013.01); *H04N 21/2368* (2013.01); *H04N 21/2387* (2013.01); *H04N 21/42646* (2013.01); *H04N 21/4341* (2013.01); *H04N 21/44008* (2013.01); *G11B 20/00007* (2013.01); *G11B 20/10527* (2013.01); *G11B 2020/00036* (2013.01); *G11B 2020/00072* (2013.01); *G11B 2020/1062* (2013.01); *H04N 19/70* (2014.11); *H04N 19/44* (2014.11); *G11B 27/19* (2013.01); *G11B 27/34* (2013.01); *G11B 27/22* (2013.01)

(56) References Cited

U.S. PATENT DOCUMENTS

| | | |
|---|---|---|
| 8,798,447 B2 * | 8/2014 | Shimada et al. ............ 386/345 |
| 2002/0044757 A1 | 4/2002 | Kawamura et al. |
| 2003/0007780 A1 | 1/2003 | Senoh |
| 2003/0235404 A1 | 12/2003 | Seo et al. |

FOREIGN PATENT DOCUMENTS

| | | |
|---|---|---|
| EP | 1675395 A1 | 6/2006 |
| JP | 6-164522 A | 6/1994 |
| JP | 9-106631 A | 4/1997 |
| JP | 2000-270347 A | 9/2000 |
| JP | 2002-158971 A | 5/2002 |
| JP | 2003-242753 A | 8/2003 |
| JP | 2004-120098 A | 4/2004 |
| JP | 2004-201034 A | 7/2004 |
| WO | WO 2004/045206 | 5/2004 |
| WO | WO 2005/024828 A1 | 3/2005 |
| WO | WO 2005/039177 A1 | 4/2005 |

* cited by examiner

FIG.4

```
ADDRESS MANAGEMENT FILE ( ) {
    Start_PTS
    End_PTS
    num_of_video ~~500
    num_of audio
    for (i=0 ; i<num_of_video ; i++) {
        pack_ID
    }
    for (j=0 ; j<num_of_audio ; j++) {
        paket_ID
    }
    ACCESS POINT MANAGEMENT TABLE ( ) {
        num_of_entry
510~    for (n=0 ; n<num_of_entry ; n++) {
            PTS_GOP_Start  ~~501
            SPN_GOP_Start  ~~502
            I_Pic_Size ~~503
        }
    }
}
```

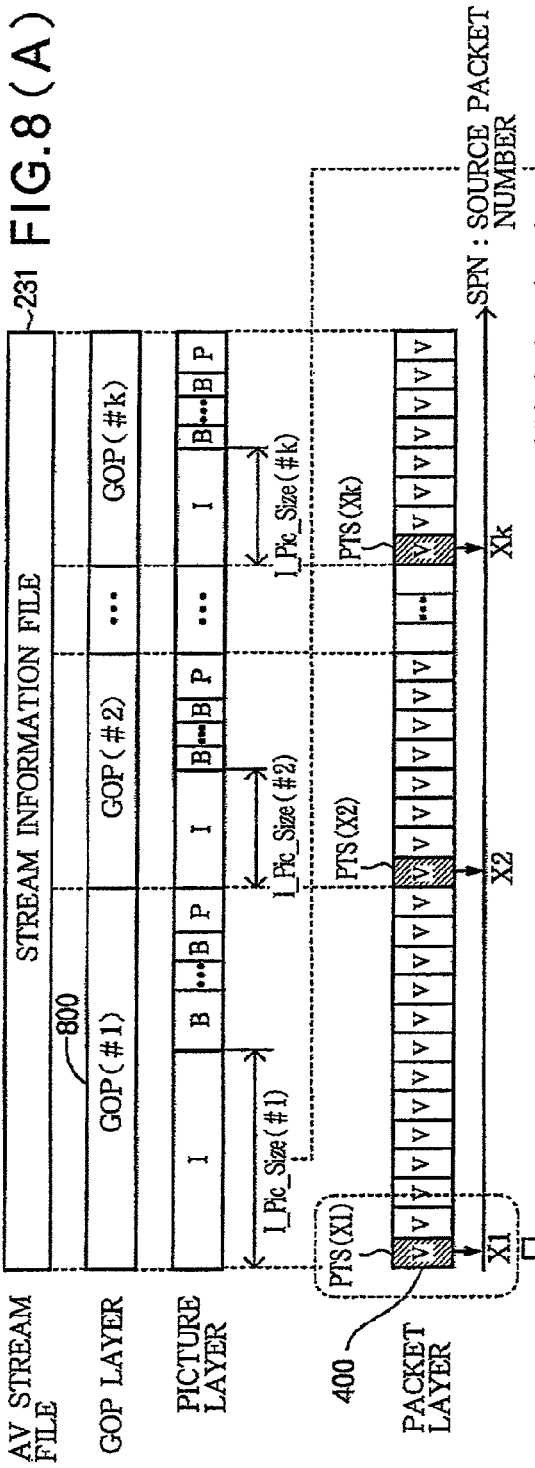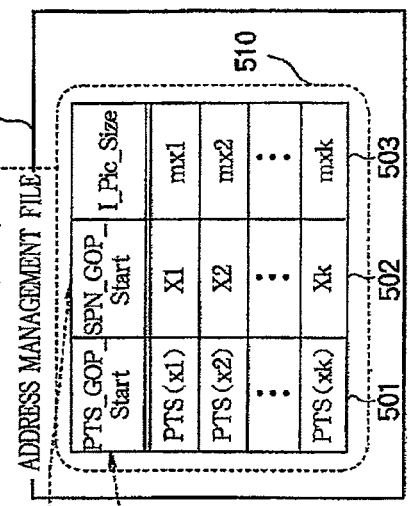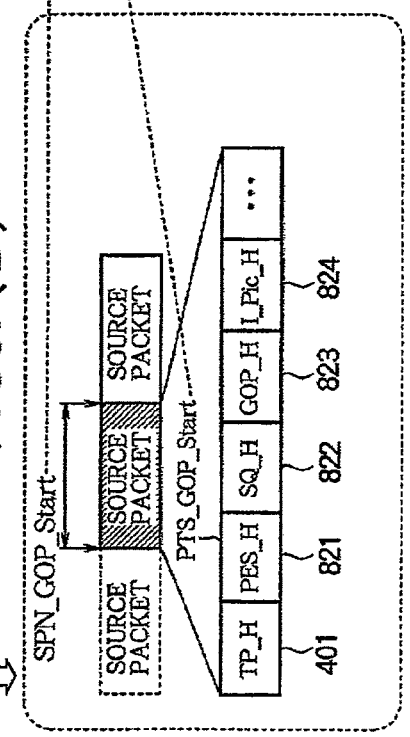

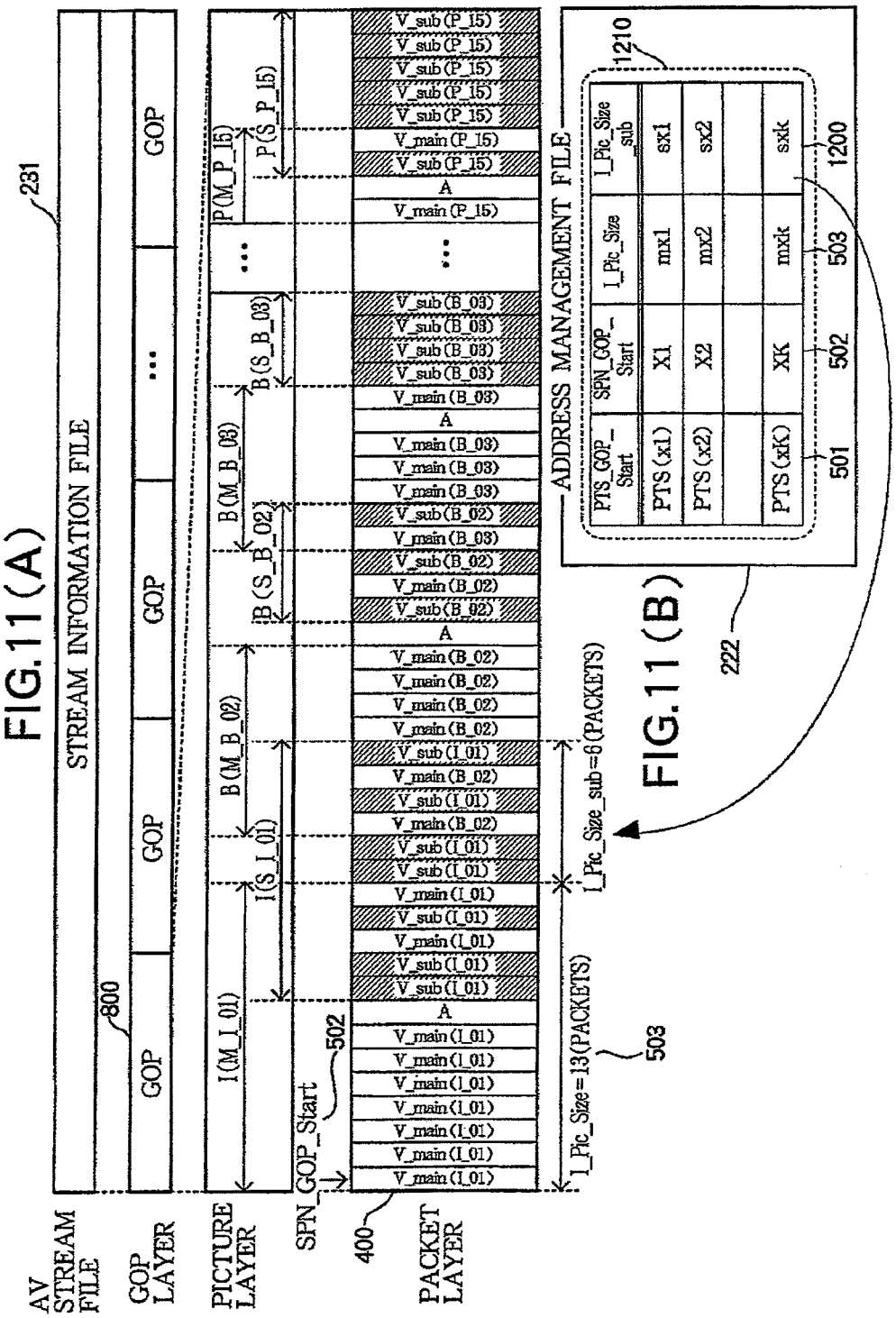

```
ACCESS POINT MANAGEMENT TABLE () {
    num_of_entry
    for (n=0 ; n<num_of_entry ; n++) {
        PTS_GOP_Start      ~~501
        SPN_GOP_Start      ~~502
        I_Pic_Size         ~~503
        for (m=1 ; m<num_of_video ; m++) {
            I_Pic_Size_Sub ~~1200
        }
    }
}
```

FIG.15(A)
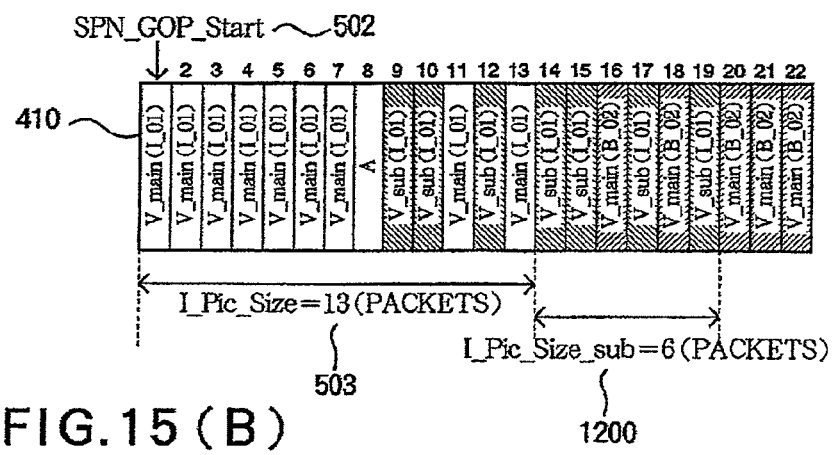
FIG.15(B)
FIG.15(C)
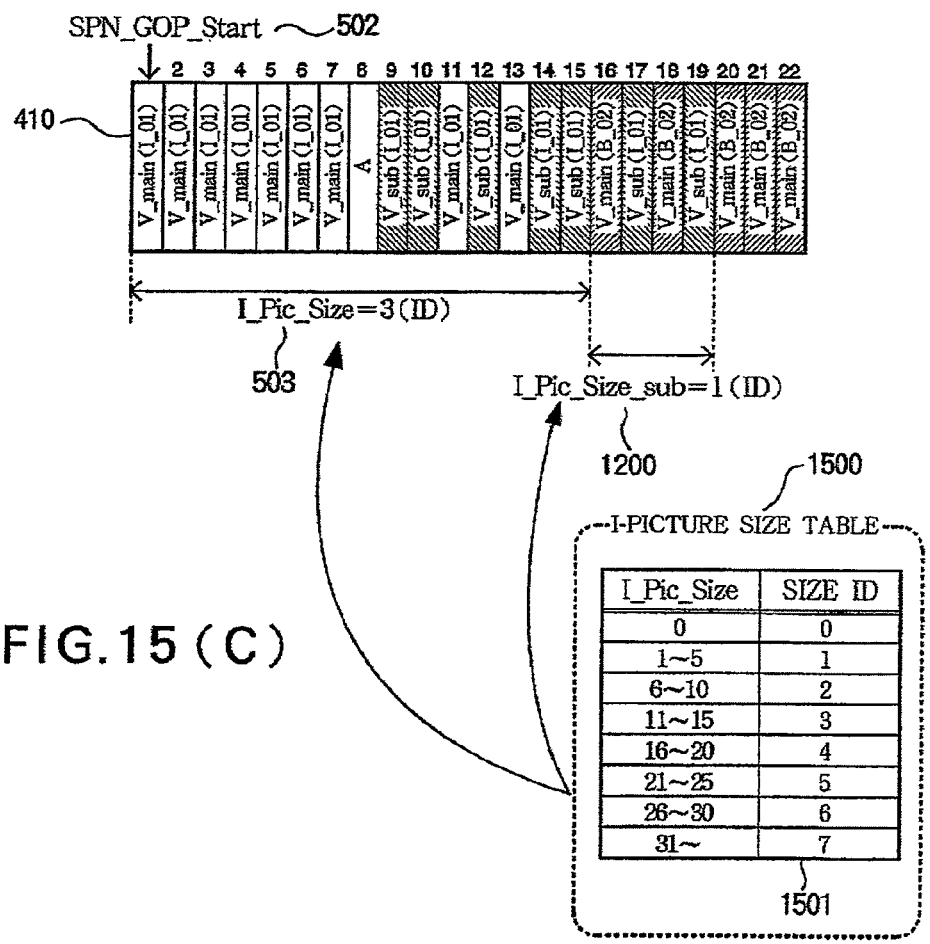

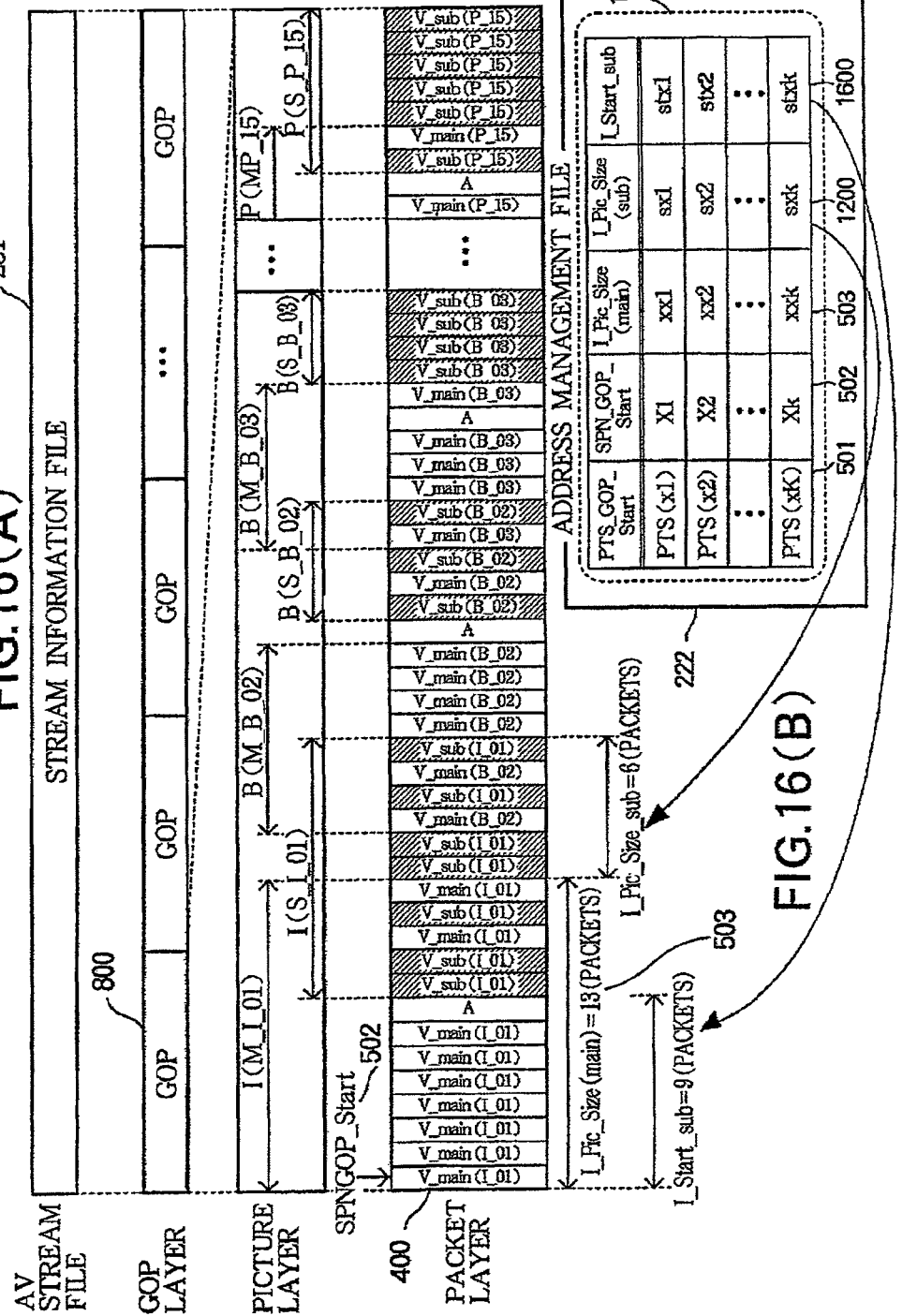

ACCESS POINT MANAGEMENT TABLE ( ) {
    num_of_entry
    for (n=0 ; n<num_of_entry ; n++) {
        PTS_GOP_Start      ~~501
        SPN_GOP_Start      ~~502
        I_Pic_Size         ~~503
        for (m=1 ; m<num_of_video ; m++) {
            I_Pic_Size_Sub ~~1200
            I_Start_Sub    ~~1600
        }
    }
}
```

FIG.19(A)
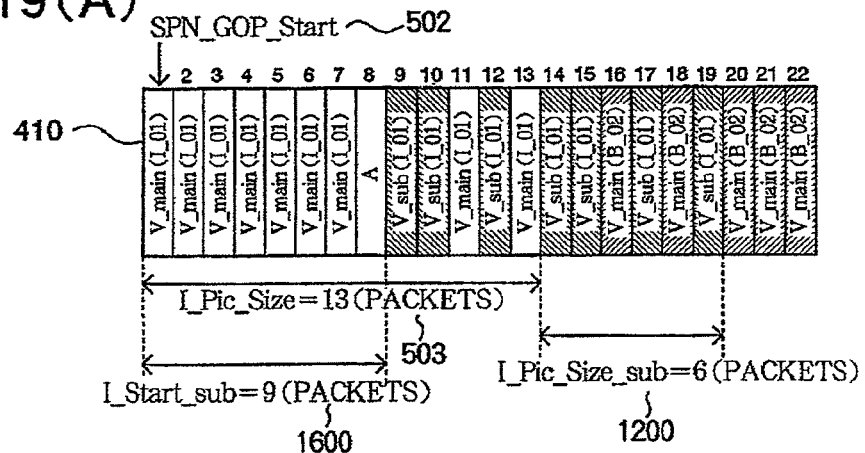
FIG.19(B)
FIG.19(C)
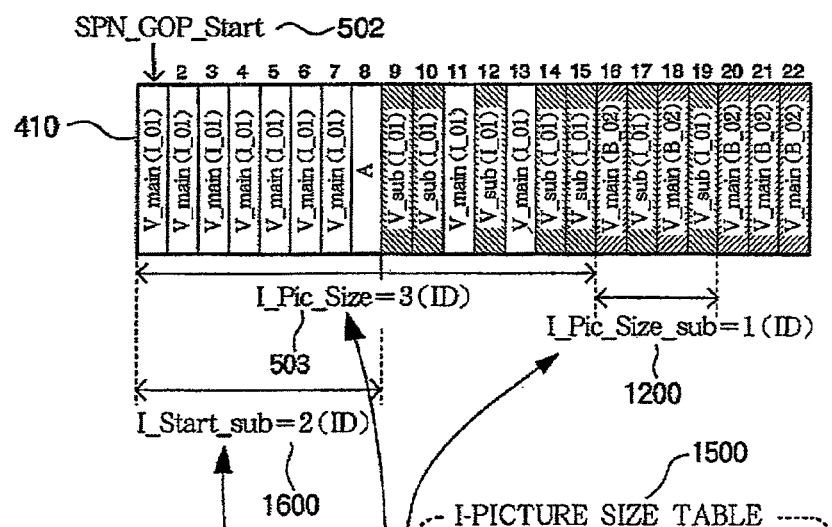

ated application Ser. No. 14/269,908 filed on May 5, 2014, which is a Divisional of copending application Ser. No. 14/132,433 filed on Dec. 18, 2013, which is a Divisional of copending application Ser. No. 13/158,964 filed on Jun. 13, 2011 (which is now U.S. Pat. No. 8,639,090 B2), which is a Divisional of copending application Ser. No. 11/665,621 filed on Apr. 18, 2007 (now U.S. Pat. No. 8,027,563 B2), which is the National Phase of PCT International Application No. PCT/JP2006/311292 filed on Jun. 6, 2006 (which is now WO 2007/017986 A1), which claims benefit to Patent Application No. JP2005-232619 filed in Japan, on Aug. 10, 2005. The entire contents of all of the above applications are hereby incorporated by reference.

RECORDING MEDIUM, REPRODUCING APPARATUS, AND REPRODUCING METHOD

This application is a Divisional of copending application Ser. No. 14/269,908 filed on May 5, 2014, which is a Divisional of copending application Ser. No. 14/132,433 filed on Dec. 18, 2013, which is a Divisional of copending application Ser. No. 13/158,964 filed on Jun. 13, 2011 (which is now U.S. Pat. No. 8,639,090 B2), which is a Divisional of copending application Ser. No. 11/665,621 filed on Apr. 18, 2007 (now U.S. Pat. No. 8,027,563 B2), which is the National Phase of PCT International Application No. PCT/JP2006/311292 filed on Jun. 6, 2006 (which is now WO 2007/017986 A1), which claims benefit to Patent Application No. JP2005-232619 filed in Japan, on Aug. 10, 2005. The entire contents of all of the above applications are hereby incorporated by reference.

FIELD OF THE INVENTION

The present invention relates to a recording medium, more particularly to a disc recording medium enabling the rapid location of data for displaying images in each of a plurality of streams recorded on the recording medium.

BACKGROUND ART

When content such as program or movie content is recorded on a recording medium, the video data of the content are coded by a coding method such as the MPEG (Moving Picture Experts Group) method to create a video stream. The audio data of the content are coded by a method such as the AC-3 method to create an audio stream. In the MPEG-2 system stipulated in ISO/13818, the video stream and the audio stream are multiplexed into a TS (Transport Stream). The video data or audio data in the video stream or audio stream are broken up into 188-byte source packets, which are the minimum units of access. In the description below, video streams and audio streams will also be referred to simply as 'streams'.

A video stream is made up of GOPs (Groups of Pictures), where a GOP is about 0.5 seconds in terms of video reproduction time. A GOP comprises I-pictures obtained by intra-frame coding, P-pictures obtained by inter-frame predictive coding in the forward direction, and B-pictures obtained by bidirectional predictive coding (in the description below, the term 'picture' will be used as a general term for I-pictures, P-pictures, and B-pictures).

An I-picture is placed at the beginning of a GOP. The I-picture at the beginning of a GOP is also treated as an access point: a position at which random access to the video stream is possible. The I-picture at the beginning of every GOP does not necessarily become an access point; if a plurality of GOPs constitute one access unit, for example, then the I-picture at the beginning of the first GOP among the plurality of GOPs is set as the access point.

In trick reproduction modes such as the fast-forward mode in which the video content is viewed by skipping from picture to picture, or when a function such as time search is used to start the reproduction of the content from an intermediate point in the content specified by a time, in general, first an I-picture is decoded and reproduced. To perform trick reproduction etc. at higher speeds, it is necessary to detect the positions of the I-pictures and their constituent source packets quickly. The reason why trick reproduction starts with the decoding of an I-picture is that until an I-picture is decoded, it is not possible to decode other pictures.

The I-pictures in a stream are conventionally detected with reference to an EP_Map in which the display time information (PTS: Presentation Time Stamp) and I-picture positional information (SPN: Source Packet Number) are stored. An EP_Map is provided for every GOP (e.g., Patent Document 1).

Information concerning the size of the I-pictures may be added to the above PTS and SPN information, these data may be assembled into a table and stored in the EP_Map, and the table stored in the EP_Map may be referred to in order to detect the position and size of the I-picture (e.g., Patent Document 2).

Patent Document 1: Japanese Patent Application Publication No. 2002-158971 (pp. 38-40, FIG. 138)
Patent Document 2: Japanese Patent Application Publication No. 2004-201034 (pp. 11-12, FIG. 5)

DISCLOSURE OF THE INVENTION

Problems to be Solved by the Invention

In the invention described in Patent Document 1, however, although the PTS and SPN are detectable, the size of an I-picture is undetectable. Accordingly, after detecting the first of the source packets constituting an I-picture, the player or other reproducing apparatus must decide whether each succeeding source packet belongs to the I-picture or not. In this case, reading an I-picture takes a long time.

In the invention described in Patent Document 2, when a plurality of video streams are multiplexed into a single TS, the above table must be provided separately for each video stream. In this case, the amount of information in these tables assumes vast proportions, using up much of the storage space in the optical disc or other recording medium. Normally it is also necessary to store the tables in the memory of the reproducing apparatus before reproduction of the streams recorded on the recording medium. In this case, if the amount of information in the tables is vast as noted above, an increased amount of memory space is needed to store the tables. The invention described in Patent Document 2 accordingly leads to increases in the cost of the reproducing apparatus and the size of its circuitry.

As the uses of optical discs and other such media have diversified in recent years, sometimes a plurality of video streams are recorded as parts of the same content on an optical disc. As a specific example, scenes of the making of a movie and comments by the director may be displayed simultaneously with the movie itself. In this case, two video streams are multiplexed, one being the video stream of the movie, the other being the video stream of the movie-making scenes etc., and the multiplexed streams are recorded on the optical disc as a single stream. Video streams representing different programs may also be multiplexed and recorded on an optical disc as a single stream. In the inventions of Patent Documents 1 and 2, however, much recording space is used in dealing with this situation, leading to increases in the cost of the player or other reproducing apparatus and the size of its circuitry.

The present invention addresses the above problems with the object of obtaining a recording medium enabling a particular picture included in a stream such as a TS in which a plurality of video streams are multiplexed to be found quickly from substantially the same amount of information as in the past.

Means of Solution of the Problems

In a recording medium on which is recorded a multiplexed stream including a plurality of first packets constituting a first I-picture in a first video stream and a plurality of second packets constituting a second I-picture in a second video stream, a recording medium according to the present invention has recorded thereon information for identifying the first I-picture and information for identifying the second I-picture.

Effect of the Invention

According to the present invention a particular picture included in a stream such as a TS in which a plurality of types of video streams are multiplexed can be detected quickly from substantially the same amount of information as in the past.

BRIEF DESCRIPTION OF THE DRAWINGS

FIG. 4 is an explanatory diagram of the syntax of an address management file 222.

FIG. 8 (A), FIG. 8 (B), and FIG. 8 (C) schematically show the relationship between an address management file 222 and a stream information file 231.

FIG. 11 (A) and FIG. 11 (B) are explanatory diagrams depicting the data structure of a stream information file 231 in which a PIP stream is stored and the data structure of the address management file 222 corresponding to the PIP stream, in a second embodiment.

FIG. 12 is an explanatory diagram of the syntax of the address management file 222 corresponding to a stream information file 231 in which a PIP stream is stored.

FIG. 15 (A), FIG. 15 (B), and FIG. 15 (C) are explanatory diagrams showing other examples of the information recorded in 'I_Pic_Size' 503 and 'I_Pic_Size_Sub' 1200.

FIG. 16 (A) and FIG. 16 (B) is an explanatory diagram depicting the data structure of a stream information file 231 in which a PIP stream is stored and the data structure of the address management file 222 corresponding to the PIP stream, according to the third embodiment.

FIG. 17 is an explanatory diagram of the syntax of the access point management table 1610 in the third embodiment.

FIG. 19 (A), FIG. 19 (B), and FIG. 19 (C) are explanatory diagrams depicting the recording of a size ID in the 'I_Pic_Size' 503, 'I_Pic_Size_Sub' 1200, and 'I_Start_Sub' 1600.

Figure 1:
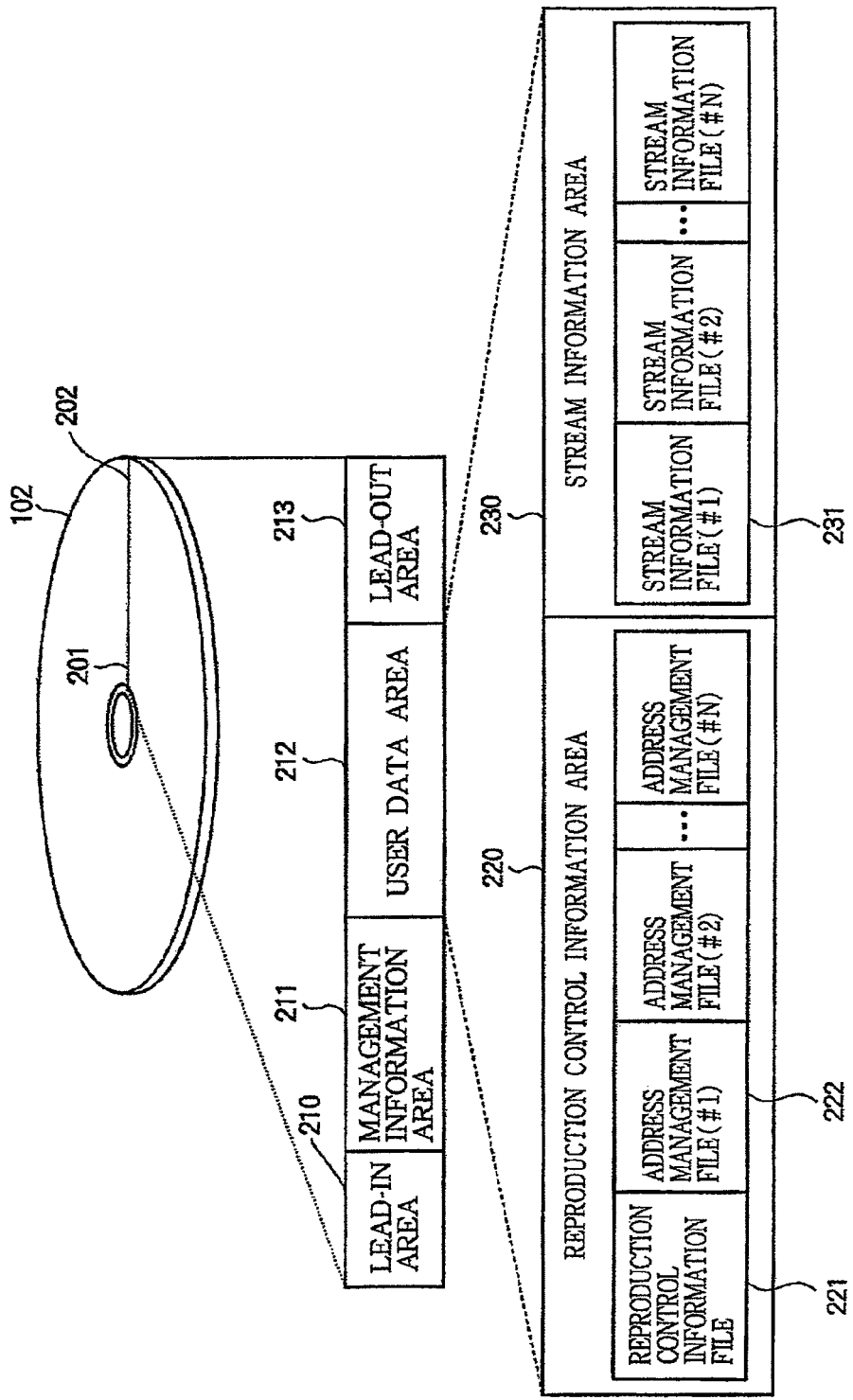
FIG. 1 is an explanatory diagram depicting the data structure of the optical disc 102 in the first embodiment of this invention.

EXPLANATION OF REFERENCE CHARACTERS 100 reproducing apparatus, 101 system control unit, 102 optical disc, 103 reproducing drive unit, 110 demultiplexer, 111 main video decoder, 112 sub video decoder, 113 audio decoder, 114 video mixer, 115 display unit, 120 memory unit, 130 operation unit.

BEST MODE OF PRACTICING THE INVENTION

First Embodiment

FIG. 1 is an explanatory diagram depicting the data structure of the optical disc 102 in the first embodiment of this invention. Data are recorded on the optical disc 102 from its inner circumference 201 to its outer circumference 202. A lead-in area 210 in which starting information about the optical disc 102, its physical characteristics, and the like are recorded is disposed at the innermost circumference of the optical disc. Information about the file system of the optical disc 102 (also referred to below as file system information) is recorded in a management information area 211 disposed just outside the lead-in area 210 of the optical disc 102. Content data (TS etc.) is recorded by the manufacturer (content provider) in a user data area 212 disposed just outside the management information area 211 in the optical disc 102. Information concerning the ending position of the optical disc 102 is recorded in a lead-out area 213 disposed just outside the user data area 212 of the optical disc 102.

The user data area 212 comprises a reproduction control information area 220 and a stream information area 230. The stream information area 230 comprises a plurality of stream information files 231 in which the TS's are recorded in predetermined units. The reproduction control information area 220 comprises one reproduction control information file 221 and one (#1) or a plurality (#1, ... , #N) of address management files 222. The information recorded in the reproduction control information file 221 includes information (play interval information) indicating the intervals on the stream to be reproduced in correspondence to the content (hereinafter referred to as 'play intervals', described later), information indicating the order in which the plurality of streams specified by the play intervals are to be reproduced (reproduction order information), information relating to the content of the stream information files 231 (content information), etc. The content information is information giving, for example, the author of the content.

The address management files 222 are in one-to-one correspondence with the stream information files 231. Specifically, the address management files 222 and stream information files 231 correspond by having, for example, identical file names. The information recorded in an address management file 222 includes the starting addresses of the access points in the stream stored in the corresponding stream information file 231, the sizes of the I-pictures set as access points, and the PTS values of the I-pictures set as access points. FIG. 1 shows a configuration that has one reproduction control information file, but the reproduction control information file may be divided into a plurality of files on the optical disc 102.

Figure 2:
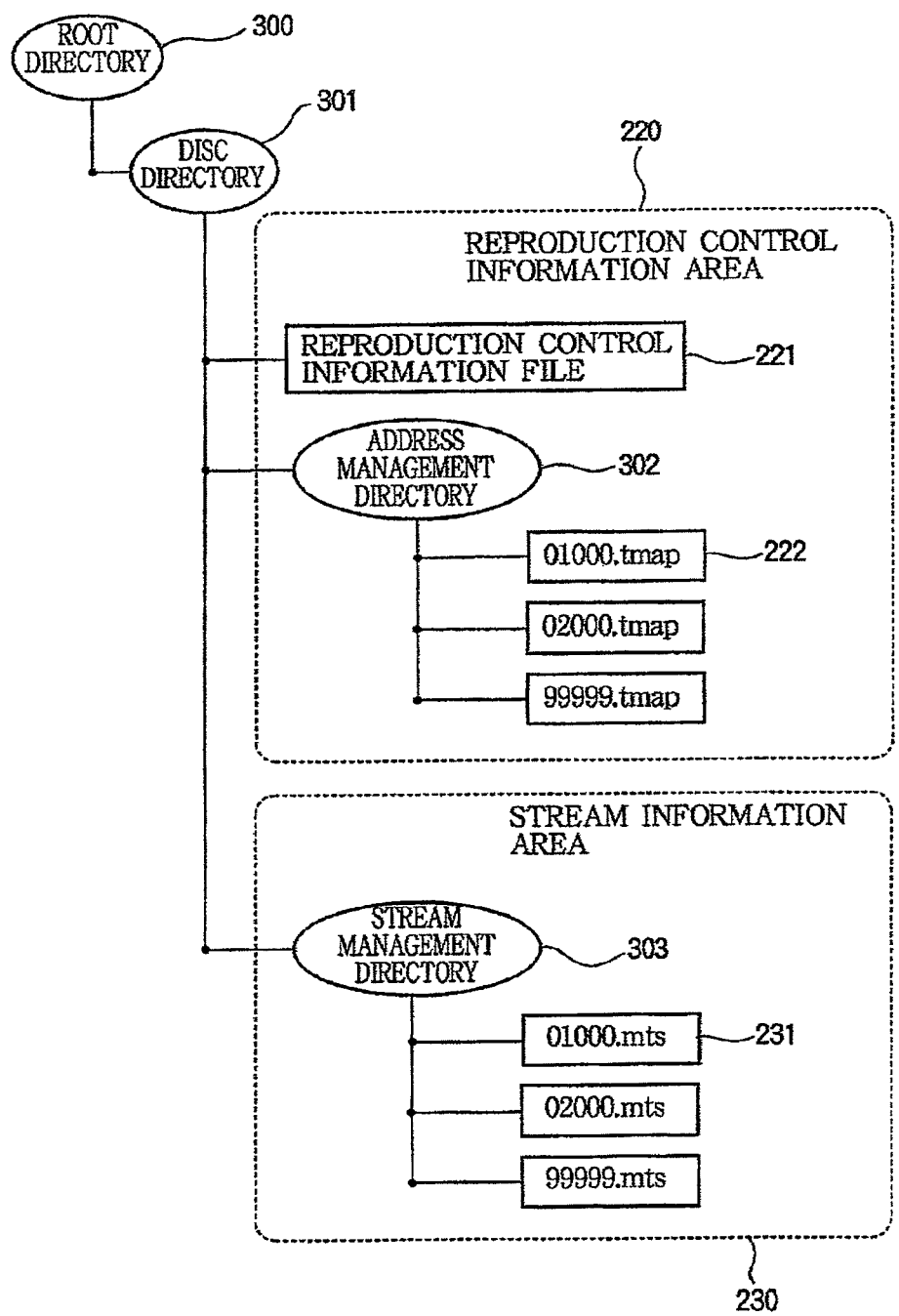
FIG. 2 schematically shows the logical file structure of the optical disc 102.

FIG. 2 schematically shows the logical file structure of the optical disc 102. The top stratum of this file structure is a root directory 300. A disc directory 301 is subordinate to the root directory 300. The reproduction control information file 221, an address management directory 302, and a stream management directory 303 are subordinate to the disc directory 301. The address management files 222 are subordinate to the address management directory 302, and the stream information files 231 are subordinate to the stream management directory 303.

The reproduction control information area 220 shown in FIG. 1 comprises the reproduction control information file 221 and the address management files 222 subordinate to the address management directory 302. The stream information area 230 comprises the stream information files 231 subordinate to the stream management directory 303.

As noted above, the address management files 222 are in correspondence with the stream information file 231. In FIG. 2, the correspondence is indicated by identical file names: for example, the address control file represented by '01000.tmap' in FIG. 2 corresponds to the stream information file represented by '01000.mts'. The notations 'tmap' and 'mts' are extensions of the file names. Any file names may be used.

Although the address management files 222 and stream information files 231 are shown located in separate directories in FIG. 2, the address management files 222 and the stream information files 231 may be located in the same directory. The address management files 222 and stream information files 231 may also be subordinate to the root directory 300 (i.e., at the same hierarchical level as the disc directory). Furthermore, although the address management files 222 and stream information files 231 in FIG. 2 were described as corresponding one-to-one, one address management file 222 may correspond to a plurality of stream information files 231, or a plurality of address management files 222 may correspond to one stream information file 231.

Figure 3:
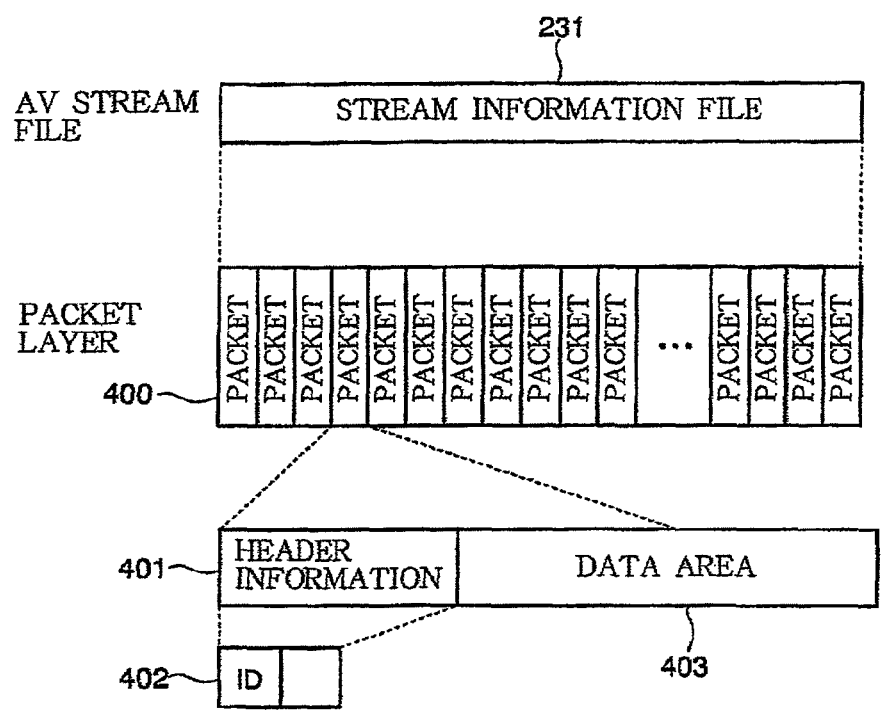
FIG. 3 is an explanatory diagram for giving a simplified description of the structure of a stream information file 231.

FIG. 3 is an explanatory diagram that will be used to give a simple description of the structure of a stream information file 231. A stream information file 231 comprises a plurality of source packets 400 (a source packet 400 may be simply referred to as a packet 400 below). More specifically, a stream information file 231 comprises a multiplexed plurality of packets 400 obtained by coding the video data and audio data of the aforesaid content, then dividing the coded data into fixed amounts of information (a packet 400 of video data will also be referred to as a V-packet (Video-packet) and a packet 400 of audio data will also be referred to below as an A-packet (Audio-packet) below).

Each packet 400 comprises a data area 403 in which video data or audio data are recorded, and header information 401 in which is recorded an ID (Identification) 403 corresponding to the type of data recorded in the data area. Accordingly, if the packet is a V-packet, for example, video data are recorded in the data area 403, and an ID 402 indicating that the packet 400 is a V-packet is recorded in the header information 401. The header information 402 is prefixed at the front of the packet.

FIG. 4 is an explanatory diagram of the syntax of an address management file 222. The PTS (Presentation Time Stamp) indicating the starting display time of the first picture in the stream information file 231 corresponding to the address management file 222 is recorded in 'Start_PTS'. The PTS indicating the ending display time of the last picture in this stream information file 231 is recorded in 'End_PTS'. The total number of video streams in the stream information file 231 is recorded in 'num_of_video' 500. The total number of audio streams in the stream information file 231 is recorded in 'num_of_audio'.

The first loop statement (for(i=0; . . . ){ . . . }) following 'num_of_audio' is repeated for the number of times indicated by 'num_of_video' 500. The second loop statement (for(j= 0; . . . ){ . . . }) following the first loop statement is repeated for the number of times indicated by 'num_of_audio'. The ID of each V-packet and A-packet in the stream information file 231 is recorded in the 'packet_ID' fields in the loop statements. The ID of each V-packet and A-packet is accordingly detected by execution of these loop statements in the reproducing apparatus (described later) or other apparatus that reproduces the optical disc 102.

Information necessary for detecting a position specified during trick reproduction or a time search (i.e. information regarding an access point) is recorded in an access point management table 510. For example, when the video data corresponding to the content is coded into a video stream according to MPEG-2, the start of a GOP is an access point.

The item 'num_of_entry' indicates the total number of access points in the stream information file 231 corresponding to the address management file 222. The loop statement following 'num_of_entry' is repeated for the number of times indicated by 'num_of_entry'. The PTS indicating the starting display time of an I-picture used as an access point is recorded in 'PTS_GOP_Start' 501 in the loop statement. PTS values corresponding to source packet numbers X1, X2, and Xk are represented by PTS(x1), PTS(x2), and PTS (xk), respectively. 'SPN_GOP_Start' 502 indicates the number of packets from the first packet in the stream information file 231 to the first packet among the packets constituting the I-picture (the position of this packet will also be referred to below as 'the start of the access point').

Since a packet has a fixed length (188 bytes in MPEG-2), the number of bytes from the start of the stream information file 231 to the start of the access point can be calculated by multiplying the value of 'SPN_GOP_Start' 502 by the fixed length value. Accordingly, if the value of 'SPN_GOP_Start' 502 is 5 (packets), for example, and the packet length is 188 bytes, then the number of bytes from the start of the stream information file 231 to the start of the access point is:

$$5 \text{ (packets)} \times 188 \text{ (bytes)} = 940 \text{ (bytes)}$$

(where × is the multiplication symbol). The starting positions of an I-picture needed by the reproducing apparatus in trick reproduction or a time search can be located (cued) by referring to the 'PTS_GOP_Start' 501 and 'SPN_GOP_Start' 502 as explained above.

Information representing the size of an I-picture that is used as an access point is recorded in 'I_Pic_Size' 503. Specifically, the number of packets from the packet indicated by 'SPN_GOP_Start' 502 to the last packet in the packets constituting the I-picture is recorded in 'I_Pic_Size' 503. The size of the I-picture can accordingly be detected by referring to 'I_Pic_Size' 503. Specifically, the size of the I-picture (the size expressed in bytes) can be obtained by multiplying the value (number of packets) indicated by 'I_Pic_Size' 503 by the size of the packet (188 bytes for MPEG-2).

Figure 5:
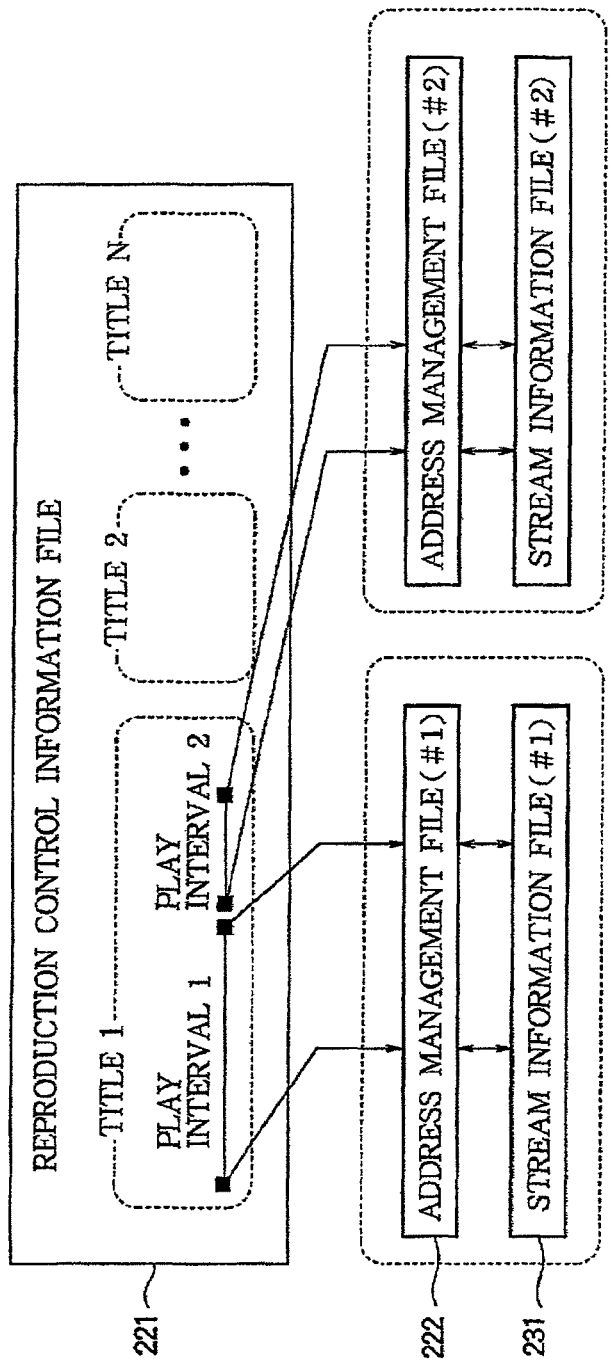
FIG. 5 is an explanatory diagram depicting the structure of the reproduction control information file 221.

FIG. 5 is an explanatory diagram depicting the structure of the reproduction control information file 221. The reproduction control information file 221 comprises a plurality of titles 1 to N. One title corresponds to one item of content (program, movie, etc.). Specifically, the intervals (play intervals) used in reproduction of the content in the streams recorded in the stream information files 231 are listed under the titles.

A title may be configured in various ways: for example, it may list (1) one play interval in one stream information file 231; (2) a plurality of play intervals in one stream information file 231; or (3) play intervals in a plurality of stream information files 231 (one or more play intervals being recorded in each of the plurality of stream information files 231). FIG. 5 shows a case in which a play interval 1 in one stream information file (#1) and a play interval 2 in another stream information file (#2) are listed under title 1 (configuration (3) above).

A play interval is determined by the file name of the address management file 222 corresponding to the stream information file 231 to be reproduced and the reproduction starting point (Start_Time) and reproduction ending point (End_Time) in the stream information file 231. In the following description, the file name, the reproduction starting point, and the reproduction ending point will be referred to collectively as play interval information.

Figure 6:
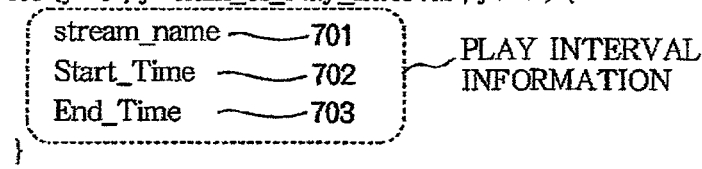
FIG. 6 is an explanatory diagram of the syntax of the reproduction control information file 221.

FIG. 6 is an explanatory diagram of the syntax of the reproduction control information file 221. In FIG. 6, the total number of content items recorded on the optical disc 102 is recorded in 'num_of_Title'. The loop statement following 'num_of_Title' is repeated for the number of times indicated by 'num_of_Title'. Information about a title (attribute information), such as the total time of the title (i.e., reproduction time of the content corresponding to the title), type of codec, and time and date of recording are recorded in 'Title_Attribute( )' in the loop statement.

The total number of items of information about play intervals recorded under the title is recorded in 'num_of_Play_Interval'. The loop statement following 'num_of_Play_Interval' is repeated for the number of times indicated by 'num_of_Play_Interval'. The file name of the stream information file 231 to be reproduced is recorded in 'stream_name' 701 in the loop statement. The reproduction start point is described in 'Start_Time' 702, and the reproduction end time is described in 'End_Time' 703. As described above, the play interval information includes information given by 'stream_name' 701, 'Start_Time' 702, and 'End_Time' 703. The PTS values indicating the starting display time and ending display time of a picture are recorded in 'Start_Time' 702 and 'End_Time' 703, respectively. The player or other reproducing apparatus can identify the interval to be reproduced (play interval) in the stream stored in the stream information file 231 from the information recorded in the reproduction control information file.

Figure 7:
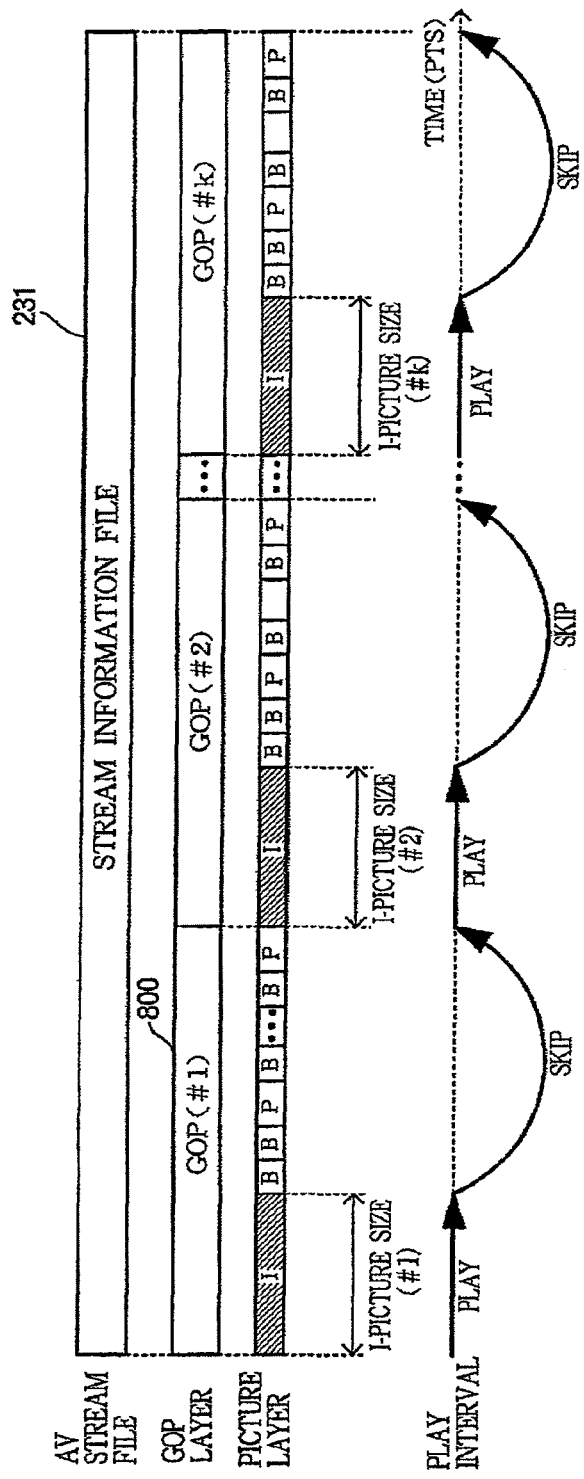
FIG. 7 is an explanatory diagram for giving a simplified description of the trick reproduction of programs etc. recorded on the optical disc 102 in the first embodiment.

FIG. 7 is an explanatory diagram that will be used to give a simple description of the trick reproduction of content recorded on the optical disc 102 in the first embodiment. Times (PTS) are indicated on the horizontal axis labeled 'play interval'. The stream information file 231 comprises one or more GOPs 800. A GOP 800 comprises I-pictures, P-pictures, and B-pictures (labeled I, P, and B). The size of an I-picture is indicated as 'I_Pic_Size'. In this trick reproduction mode, the I-pictures in the GOP 800 in the stream information file 231 of the reproduced content are reproduced by skipping (from the end of one reproduced I-picture to the start of another I-picture).

FIG. 8 (A), FIG. 8 (B), and FIG. 8 (C) schematically show the relationship between the address management file 222 and the stream information file 231. In FIG. 8 (A), 'V' indicates a video packet and 'A' indicates an audio packet. Among the packets 400 constituting each GOP, the hatched packets are the packets at the beginning of the GOP (also referred to below as leading packets), and their source packet numbers SPN are indicated as 'X1', 'X2', ..., 'Xk'. As shown in FIG. 8 (B), a leading packet includes a transport packet header (TP_H), which is the header information 401 stipulated by the MPEG standard. Besides TP_H, the packet includes a PES header (PES_H) 821, a sequence header (SQ_H) 822, and an I-picture header (I_PIC_H) 824 indicating the first byte of the I-picture information starting from the SQ_H. The PTS indicating the starting display time of the picture is recorded in the PES header 821.

The reproducing apparatus interprets the syntax of the address management file 222 described with reference to FIG. 4 to construct an access point management table 510 with an entry for each GOP (each access point) giving its 'PTS_GOP_Start' 501, which is the PTS of the starting display time of its I-picture, 'SPN_GOP_Start' 502, which is positional information indicating the first source packet 400 among the packets constituting the I-picture, and 'I_Pic_Size' 503, which is information indicating the size of the I-picture.

Figure 9:
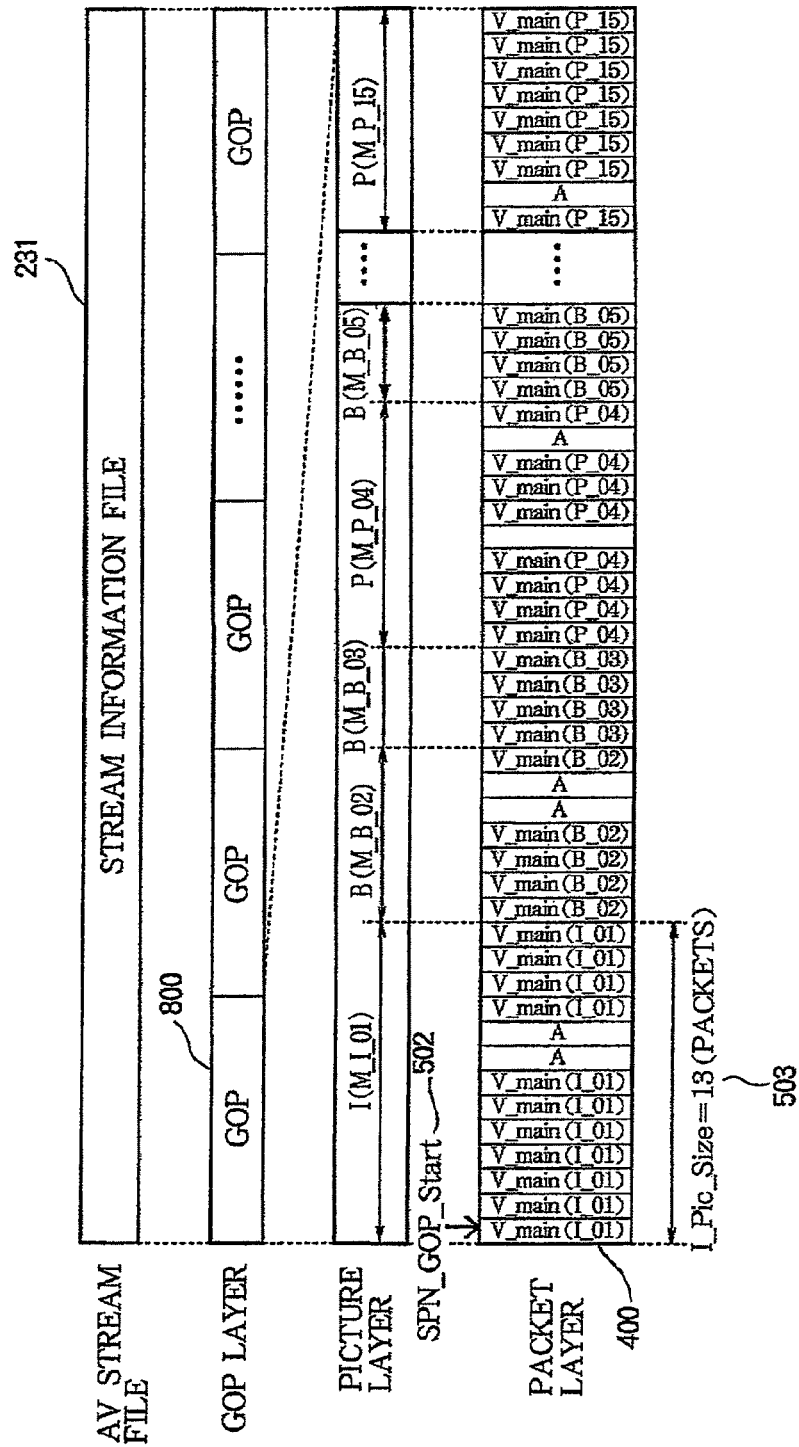
FIG. 9 is an explanatory diagram depicting the relationship between a stream information file 231 and its 'SPN_GOP_Start' 502 and 'I_Pic_Size' 503 information.

FIG. 9 is an explanatory diagram depicting the relationship between the stream information file 231 and its 'SPN_GOP_Start' 502 and 'I_Pic_Size' 503 information. As shown in FIG. 9, the stream information file 231 comprises a plurality of GOPs 800. A GOP 800 comprises a plurality of pictures. A picture comprises a plurality of source packets 400. There are two types of packets 400, i.e., V-packets corresponding to video data (V_main packets in FIG. 9) and A-packets corresponding to audio data. A stream information file 231 is therefore an area in which multiplexed streams of V-packets and A-packets are stored.

In FIG. 9, the symbols in parentheses in the picture notations indicate: (1) the type of packets constituting the picture; (2) the type of picture, that is, whether the picture is an I-picture, P-picture, or B-picture; and (3) the position of the picture relative to the start of the GOP. For example, 'P(M_P_04)' indicates that the picture comprises V_main packets, the picture is a P-picture, and the picture is the fourth picture from the start of the GOP.

The symbols in parentheses in each V-packet indicate: (1) the type of picture to which the V-packet belongs, i.e., whether the picture is an I-picture, P-picture, B-picture; and (2) the position of the picture relative to the start of the GOP. For example, 'V_main(P_04)' indicates that the V_main packet is part of a P-picture and the P-picture is the fourth picture from the start of the GOP.

'SPN_GOP_Start' 502 indicates the relative number of packets from the start of the stream information file 231. For example, if the first packet in the first GOP in the stream information file 231 in FIG. 9 is also the first packet in the stream information file 231, then 'SPN_GOP_Start' 502 is '1 (packet)'. 'I_Pic_Size' 503 indicates the relative number of packets from the point specified by 'SPN_GOP_Start' 502 in the stream information file 231 to the last V-packet in the I-picture. For example, if the source packets 400 constituting the I-picture in the first GOP in the stream information file 231 are situated within the thirteen source packets 400 starting from the first packet in the stream information file 231 (the packet position specified by 'SPN_GOP_Start' 502 in FIG. 9), then 'I_Pic_Size' 503 is '13 (packets)'. Although 'SPN_GOP_Start' 502 and 'I_Pic_Size' 503 represent relative numbers of packets in the above description, 'SPN_GOP_Start' 502 and 'I_Pic_Size' 503 may represent relative numbers of bytes. That is, the result of multiplication of the number of packets and the above-mentioned fixed length may be recorded in 'SPN_GOP_Start' 502 and 'I_Pic_Size' 503.

In the above description, the stream stored in the stream information file 231 is described as a video stream comprising one type of V-packet (V_main) (there is only one type of video stream), but a plurality of video streams may be multiplexed into one stream and stored in the stream information file 231. Next, the structure of the stream information file 231 etc. in a case in which a plurality of video streams are multiplexed and stored will be described.

Figures 10A, 10B, 10C, 10D:
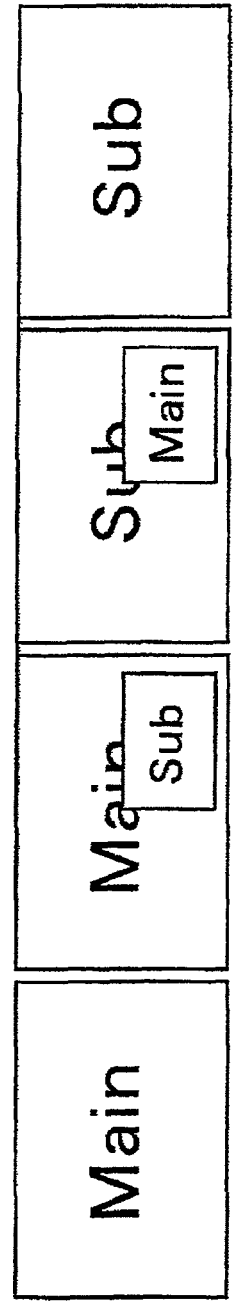
FIG. 10 (A) to FIG. 10 (D) are explanatory diagrams depicting images displayed when a plurality of video data streams are stored in a stream information file 231 and the video data are reproduced by a reproducing apparatus.

FIG. 10 (A) to FIG. 10 (D) are explanatory diagrams depicting a video display when a plurality of video data streams are stored in a stream information file 231 and video pictures corresponding to the plurality of video data streams are reproduced by a reproducing apparatus. In the following description, two video streams are stored in the stream information file 231. One of these streams will be referred to as the first video stream or main video stream, and the other video stream will be referred to as the second video stream or sub video stream. The video image corresponding to the first video stream will be referred to as the first video image or main video image, and the video image corresponding to the second video stream as the second video image or sub video image. Alternatively, one of the first or second video streams may support HD (High Definition), while the other video stream supports SD (Standard Definition).

FIG. 10 (A) shows a case in which only the main video image is displayed; the letters 'Main' indicate main video. FIG. 10 (B) shows a PIP (Picture In Picture) display in which the sub video data ('Sub' indicates sub video) are superimposed on the main video data. FIG. 10 (C) shows a PIP display in which the main video data are superimposed on the sub video data. FIG. 10 (D) shows a case in which only the sub video image is displayed. When two video streams are stored in the stream information file 231, there are four possible video display modes as described above. In a PIP display, the size, the position, and the degree of transparency of the superimposed region can be set arbitrarily. In the following description, a stream in which packets corresponding to a plurality of video streams are multiplexed will also be referred to as a PIP stream.

FIG. 11 (A) and FIG. 11 (B) are explanatory diagrams depicting the data structure of a stream information file 231 in which a PIP stream is stored and the data structure of a first-embodiment address management file 222 corresponding to the PIP stream. As shown in FIG. 11 (A), the stream information file 231 in which the PIP stream is stored comprises multiplexed V-packets corresponding to a plurality of video streams. Specifically, the stream information file 231 places main video pictures (I(M_I_01) etc.) and sub video pictures (I(S_I_01) etc.) in one GOP, as shown in the picture layer in FIG. 11 (A). Therefore, as shown in the packet layer in FIG. 11 (B), the V_main packets constituting the main video stream and V_sub packets constituting the sub video stream are multiplexed in the PIP stream. In the part of the packet layer corresponding to picture I(S_I_01) in FIG. 11 (A), V_main(I_01) packets belonging to picture I(M_I_01), V_sub(I_01) packets belonging to picture I(SI_I_1), and V_main(B_02) packets belonging to picture B(M_B_02) are intermixed.

The symbols in parentheses in the picture notations in FIG. 11 (A) indicate: (1) the video stream to which the picture belongs (main video or sub video); (2) the type of picture, that is, whether the picture is an I-picture, P-picture, or B-picture; and (3) the position of the picture in the GOP 800 relative to the first picture (I-picture) in the video stream. The symbol 'S' is assigned to sub video constituents and the symbol 'M' is assigned to main video constituents. For example, 'B(S_B_02)' indicates that the picture is a sub video picture, the picture is a B-picture, and the picture is the second of the sub video pictures in the GOP.

The symbols in parentheses in the V_main packet notation indicate: (1) the type of picture to which the V-packet belongs, that is, whether the V-packet is part of an I-picture, P-picture, or B-picture; and (2) the position of the picture in the GOP relative to the start of the GOP. In FIG. 11 (A), 'V_main' indicates a V-packet in the main video stream and 'V_sub' indicates a V-packet in the sub video stream. For example, 'V_sub(P_15)' indicates that the V-packet is part of the sub video stream, that the V-packet is part of a P-picture, and that this picture is the fifteenth sub video picture in the GOP, counting from the sub video I-picture.

Each packet comprises the same type of header information as the header information 401 shown in FIG. 3. As an ID similar to the ID 402 shown in FIG. 3, the header information includes an ID indicating whether the packet is an audio data packet, a main video packet, or a sub video packet.

When a V_main packet and a V_sub packet have the same PTS value, the V_sub packet is located after the V_main packet.

Although the V_main packets and V_sub packets are intermingled in the stream described above, all the V_main packets may be located in a predefined segment of the stream, and all the V_sub packets may be located in another predefined segment of the stream. The packets in a stream stored in a stream information file 231 may be disposed in any arrangement that satisfies the requirements of the decoder model specified in the MPEG standard. Provided these requirements are satisfied, the arrangement can be set arbitrarily.

In trick reproduction using the above PIP stream, the main video I-pictures (M_I-pictures) and sub video I-pictures (S_I-pictures) need to be detected at high speed. If the main video stream and the sub video stream were to have separate address management files 222, the related amount of information would increase as described above. Therefore, in the first embodiment, the address management file 222 is structured as follows.

As shown in FIG. 11 (B), both the 'I_Pic_Size' 503 of M_I-pictures and the 'I_Pic_Size_Sub' 1200 of S_I-pictures are recorded in the access point management table 1210 in the address management file 222. 'I_Pic_Size_Sub' 1200 indicates the position of the last V_sub packet among the V_sub packets constituting the I-picture in the sub video data (V_sub (I_xx), where xx is a positive integer (1 or more). As shown in the packet layer in FIG. 11 (A), 'I_Pic_Size_Sub' 1200 is indicated by the relative number of packets counted from a starting point, the starting point being the V_sub packet immediately following the V_main packet indicated by 'I_Pic_Size' 503. Alternatively, the relative number of packets from the position of the first packet in the GOP 800, indicated by 'PTS_GOP_Start' 501, may be recorded in 'I_Pic_Size_Sub' 1200. As another alternative, the number of bytes from 'PTS_GOP_Start' 501 may be recorded in 'I_Pic_Size_Sub' 1200.

FIG. 12 is an explanatory diagram of the syntax of the address management file 222 corresponding to a stream information file 231 in which a PIP stream is stored. Descriptions of syntax items other than the access point management table 1210 will be omitted because they would be the same as the descriptions given for FIG. 4. Therefore, FIG. 12 shows only the access point management table 1210. In the following description, explanations of notation that was explained in FIG. 4 will be omitted.

The loop statement (for(M=1 ... ) following 'I_Pic_Size' 503 in FIG. 12 is repeated {(value described in 'num_of_video' 500)−1} times for each access point. In 'I_Pic_Size_Sub' 1200, the relative number of packets from the V_sub packet immediately following the V_main packet indicated by 'I_Pic_Size' 503 is recorded as information indicating the position of the last V_sub packet among the V_sub packets constituting an S_I-picture. By executing the loop statement, the reproducing apparatus detects one 'I_Pic_Size_Sub' 1200 for each sub video data stream stored in the stream information file 231.

Specifically, when one main video stream and one sub video stream are multiplexed to form the stream stored in the stream information file 231, b500 is '2'. In this case, the loop statement (for(m=1 . . . ) { . . . }) is executed just once. 'I_Pic_Size_Sub' 1200 is recorded in the access point management table 1210 for only one (=2−1) region as shown in FIG. 11 (B). When the stream includes only a main video stream (as in FIG. 9, for example), 'num_of_video' 500 is '1'. In this case, the loop statement (for(m=1 . . . ) is not executed. The number of regions for which 'I_Pic_Size_Sub' 1200 is recorded in the access point management table 1210 is accordingly zero (=1−1). In other words, no such region is present.

Figure 13:
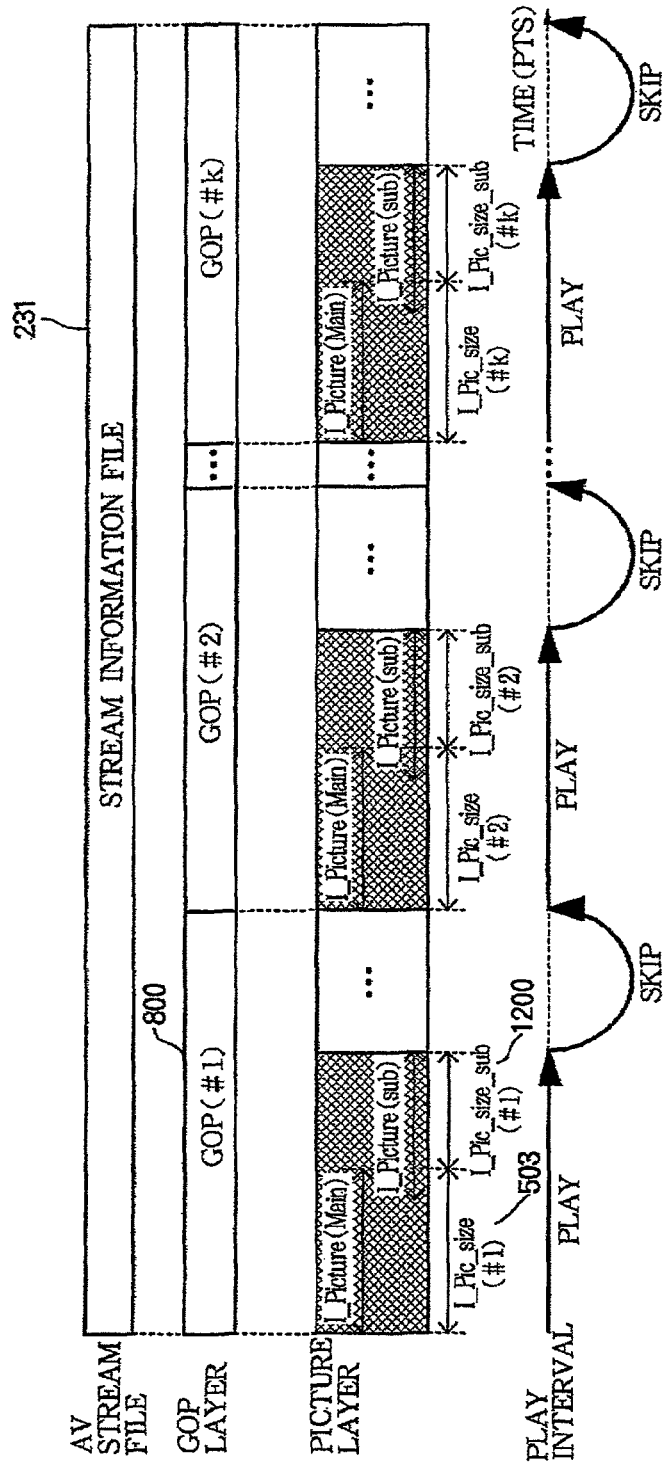
FIG. 13 is an explanatory diagram depicting trick reproduction based on an access point management table.

FIG. 13 is an explanatory diagram depicting trick reproduction based on the access point management table described with reference to FIG. 12. In the picture layer in FIG. 13, 'I_Picture(Main)' indicates a main video I-picture, while 'I_Picture(Sub)' indicates a sub video I-picture. Trick reproduction of the PIP stream can be accomplished by reading the M_I-pictures of the main video stream and the S_I-pictures of the sub video stream intermittently from the optical disc 102 and displaying them simultaneously. 'Simultaneous display' means that the M_I-picture and S_I-picture having PTS values indicating the same display time are decoded substantially simultaneously, and the M_I-picture and S_I-picture are displayed simultaneously at the time specified by the PTS.

Specifically, 'PTS_GOP_Start' 501 and 'SPN_GOP_Start' 502 are used to detect the first of the V_main packets constituting the M_I-picture. 'I_Pic_Size' 503 is used to detect the last of the V_Main packets constituting the M_I-picture. 'I_Pic_Size_Sub' 1200 is used to detect the last of the V_sub packets constituting the S_I-picture. Then the interval from the first V_main packet to the V_sub packet located at the position with a packet number corresponding to the sum of the numbers of packets indicated by 'I_Pic_Size' 503 and 'I_Pic_Size_Sub' 1200 is read from the optical disc 102. By execution of the above process for each access point, trick reproduction can be achieved by repeatedly reproducing the I-pictures in the main video stream and the I-pictures in the sub video stream and skipping the other pictures, as shown in FIG. 13.

The process described above allows all the V_main packets of an M_I-picture and all the V_sub packets of an S_I-picture to be read at once from the optical disc 102. As a result, high speed trick reproduction can be achieved in the display modes shown in FIG. 10 (B) and FIG. 10 (C).

Figure 14:
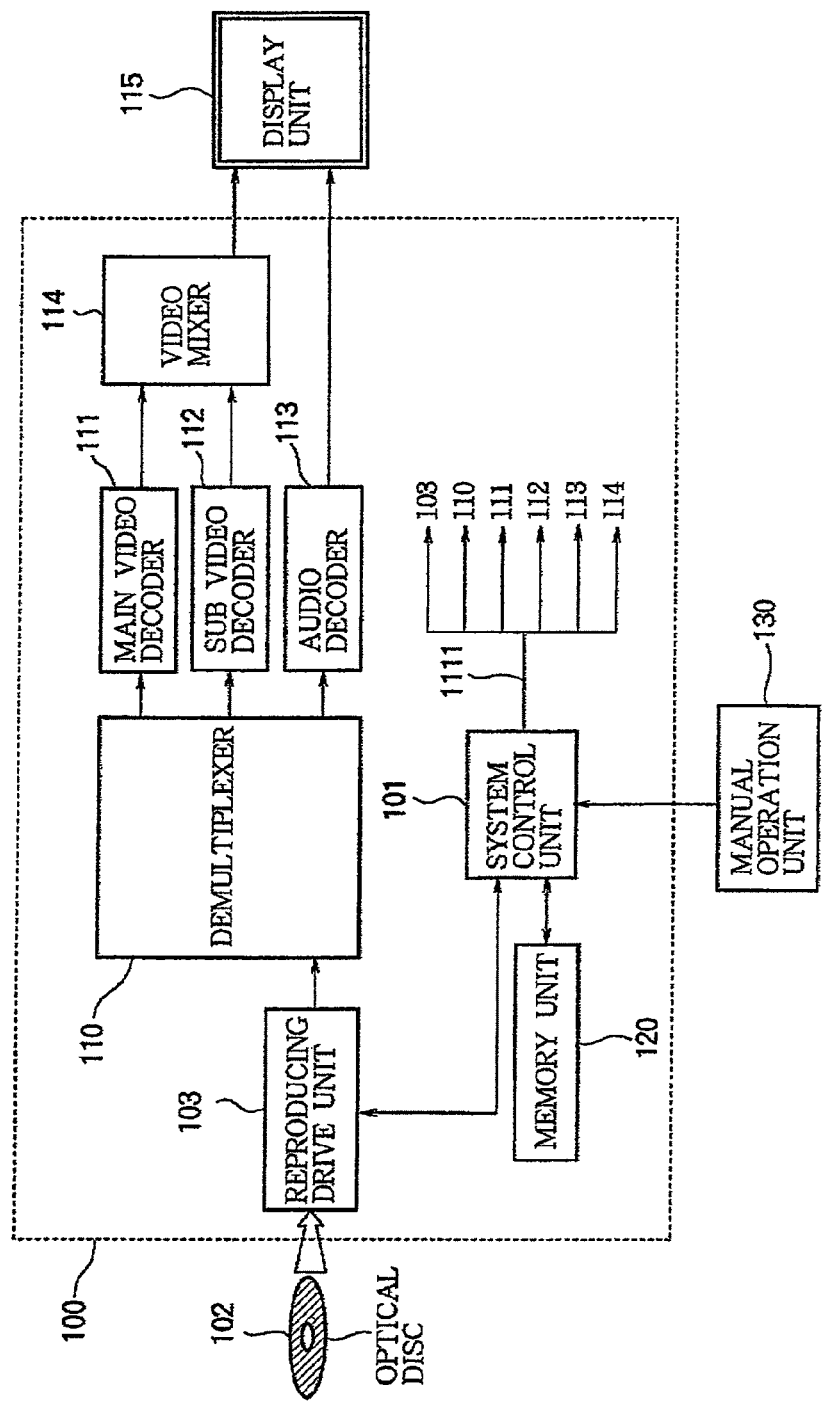
FIG. 14 is a block diagram showing the structure of a reproducing apparatus 100 for playing the optical disc 102.

FIG. 14 is a block diagram showing the structure of a reproducing apparatus 100 for playing the optical disc 102. Next, the operation of the reproducing apparatus 100 in reproducing a PIP stream in normal video reproduction mode will be described. The optical disc 102 is inserted into the reproducing drive unit 103. When the optical disc 102 is inserted, the reproducing drive unit 103 reads the file system information recorded in the management information area 211 of the optical disc 102. The file system information is interpreted in the system control unit 101. The system control unit 101 then expands the logical file structure of the optical disc 102 (FIG. 2).

Based on the expanded file structure, the system control unit 101 controls the reproducing drive unit 103 so as to read the reproduction control information file 221 and all the address management files 222 recorded on the optical disc 102. The reproducing drive unit 103 outputs the reproduction control information file 221 and address management files 222 read from the optical disc 102 to the system control unit 101. The system control unit 101 stores the reproduction control information files 221 and address management files 222 output from the reproducing drive unit 103 in a memory unit 120.

Subsequently, when a user operates an manual operation unit 130 (e.g., a remote control) to select content to be reproduced by the reproducing apparatus 100, the system control unit 101 reads the title (FIG. 5) corresponding to the content from the reproduction control information file 221 stored on the memory unit 120. The system control unit 101 also reads the play interval information constituting the title of the content (the 'stream_name' 701, 'Start_Time' 702, and 'End_Time' 703 in FIG. 5) from the reproduction control information file 221. From the memory unit 120, the system control unit 101 reads the address management file 222 corresponding to the read-out play interval information.

In reading the address management file 222, the system control unit 101 searches for an access point in the PIP stream stored in a corresponding stream information file 231. Specifically, from among the 'PTS_GOP_Start' information 501 recorded in the access point management table 1210 of the address management file 222, the system control unit 101 detects the 'PTS_GOP_Start' 501 corresponding to the 'Start_Time' 702. Next, the system control unit 101 reads the 'SPN_GOP_Start' 502 corresponding to the detected 'PTS_GOP_Start' 501 from the access point management table 1210, and acquires the position of the V_main packet corresponding to the access point from the number of packets indicated by 'SPN_GOP_Start' 502. The system control unit 101 controls the reproducing drive unit 103 so as to read the PIP stream stored in the stream information file 231 from the optical disc 102 sequentially, starting from the V_main packet corresponding to the access point.

The reproducing drive unit 103 reads the PIP stream stored in the stream information file 231 as directed by the reproducing drive unit 103 and outputs it to the demultiplexer 110. The demultiplexer 110 separates the input PIP stream into V_main packets, V_sub packets, and A-packets. The demultiplexer 110 separates packets from the PIP stream by sorting the packets according to the ID (similar to the ID 402 shown in FIG. 3) recorded in the header information 401 of each packet. The reproducing drive unit 103 outputs V_main packets to a main video decoder 111, V_sub packets to a sub video decoder 112, and A-packets to an audio decoder.

The main video decoder 111 outputs the data obtained by decoding the input V_main packets (main video data) to a video mixer 114. The sub video decoder 112 outputs the data obtained by decoding the input V_sub packets (sub video data) to the video mixer 114. The audio decoder 113 outputs the data obtained by decoding the input A-packets (audio data) to a display unit 115. The main video decoder 111, sub video decoder 112, and audio decoder 113 output data according to the time specified by the PTS recorded in the PES_H 821 (FIG. 8) of each packet.

For a PIP display, the video mixer 114 combines the main video data and sub video data output from the main video decoder 111 and sub video decoder 112 according to the predefined size, position, and transparency of the PIP window and outputs a signal corresponding to the combined result to the display unit 115. Based on the signal input from the video mixer 114, the display unit 115 displays the main and sub video pictures one within the other (see FIG. 10 (B) and FIG. 10 (C)). Together with the display, the display unit 115 outputs sound based on the audio data input from the audio decoder 113.

The video and audio components of the stream corresponding to one play interval are reproduced by carrying out the process described above up to the time corresponding to 'End_Time' 703. If the title has a plurality of play intervals, the reproducing apparatus 100 carries out the above process sequentially for each play interval. Reproduction of the content corresponding to the title ends when reproduction of the video and audio corresponding to the last play interval in the title ends.

During the above operations, the system control unit 101 outputs control signals 1111 as necessary to control the reproducing drive unit 103, demultiplexer 110, main video decoder 111, sub video decoder 112, audio decoder 113 and video mixer 114.

Next, the operation of the reproducing apparatus 100 in a trick reproduction mode will be described. In the following description, descriptions of matters that are the same as in the normal reproduction mode will not be repeated.

When a user selects a trick reproduction mode by means of the manual operation unit 130 during normal reproduction in the reproducing apparatus 100, the system control unit 101 detects and reads the address management file 222 corresponding to the stream information file 231 being reproduced at the instant when the selection was made (the selection instant), to acquire the PTS (selection instant PTS) indicating the time on the PIP stream.

From the PTS_GOP_Start information 501 recorded in the access point management table 1210 in the address management file 222 it has read, the system control unit 101 searches for the closest 'PTS_GOP_Start' 501 located after the selection instant PTS on the time axis. Based on the 'PTS_GOP_Start' 501 it finds, the system control unit 101 acquires the information ('SPN_GOP_Start' 502, 'I_Pic_Size' 503, and 'I_Pic_Size_Sub' 1200) pertaining to the access point closest to the point on the PIP stream being reproduced at the selection instant.

From the acquired 'PTS_GOP_Start' 501 and 'SPN_GOP_Start' 502, the system control unit 101 detects the first V_main packet among the V_main packets constituting the M_I-picture corresponding to the entry point to be accessed next. From 'I_Pic_Size' 503, the system control unit 101 detects the last V_main packet among the V_Main packets constituting this M_I-picture. From 'I_Pic_Size_Sub' 1200, the system control unit 101 detects the last V_sub packet among the V_sub packets constituting the S_I-picture.

The system control unit 101 controls the reproducing drive unit 103 to read all the V_main packets corresponding to the M_I-picture and all the V_sub packets corresponding to the S_I-picture from the optical disc 102. The reproducing drive unit 103 reads the V-packets from the optical disc 102 as directed by the system control unit 101. Specifically, the reproducing drive unit 103 reads the packets (V_main packets, V_sub packets, and A-packets) from the V_main packet corresponding to 'SPN_GOP_Start' 502 to the V_sub packet positioned at the packet number equal to the value of the sum of the number of packets indicated by 'I_Pic_Size' 503 and the number of packets indicated by 'I_Pic_Size_Sub' 1200, all at once.

By executing the process above for each access point, trick reproduction of the program can be achieved with a PIP display on the display unit 115. Incidentally, although the above operations are performed for each access point in the description above, in n-fold high-speed reproduction (where n is an integer or non-integer greater than zero), which is one type of trick reproduction, some of the access points processed as above can be skipped, according to the value of n.

As described above, according to the optical disc in the first embodiment, I-pictures can be rapidly retrieved from a stream such as a PIP stream that includes a multiplexed plurality of video streams, using substantially the same amount of info illation as in conventional retrieval.

In a multiplexed stream having a plurality of video streams, such as a PIP stream, all the packets constituting I-pictures in each video stream can be retrieved rapidly. The I-pictures in each video stream can therefore be read out at high speed. Even when a special type of display such as a PIP display is carried out, accordingly, rapid trick reproduction can be achieved.

The optical disc 102 according to the first embodiment can greatly reduce the amount of information (in the address management file 222) needed to retrieve sub video I-pictures. As noted above, the address management files 222 are stored in the memory unit 120 in the reproducing apparatus 100 before reproduction of the optical disc 102 begins, but for reproduction of a PIP stream, with an optical disc 102 according to the present embodiment, the amount of information in the address management files 222 stored in the memory unit 120 is small in overall terms. Therefore, the circuit size of the memory unit 120 in the reproducing apparatus 100 can be reduced. The manufacturing cost of the reproducing apparatus 100 can accordingly be reduced. Furthermore, since the system control unit 101 has less data to process during trick reproduction, trick reproduction can be started quickly.

Next, the reduction in the amount of information in the address management files 222 will be described in specific terms. First, the amount of information in the access point management table will be estimated for the case in which a stream comprises just one type of video stream.

First, it will be assumed that the reproducing apparatus 100 has a 90-kHz system time clock. 'PTS_GOP_Start' 501 is measured in 90-kHz intervals, matching the system time clock. The amount of information necessary to represent 'PTS_GOP_Start' 501 for twenty-four hours without letting the counter (not shown) that counts system clock periods return to zero (without wrapping around) can be calculated according to the following equation (1).

$$90 \times 10^3 \text{ (Hz)} \times 60 \text{ (seconds)} \times 60 \text{ (minutes)} \times 24 \text{ (hours)} = 7776000000 \tag{1}$$

The value calculated by this equation (1) can be expressed in binary notation by thirty-three bits. That is, the amount of information necessary to represent a twenty-four-hour 'PTS_GOP_Start' 501 is thirty-three bits. Next, if the storage capacity of the optical disc 102 is assumed to be 50 GB, since the amount of information in one packet is 188, the information necessary to represent 'SPN_GOP_Start' 502 for all packets in the optical disc 102 can be calculated according to the following equation (2).

$$50 \times 10^9 \text{ (bytes)}/188 \text{ (bytes)} \approx 265957447 \tag{2}$$

The value calculated by this equation (2) can be expressed in binary notation by twenty-eight bits. That is, the amount of information necessary to represent 'SPN_GOP_Start' 502 for all packets of the optical disc 102 is 28 bits. Therefore, when one stream comprises just one type of video stream, the amount of information corresponding to one entry in the access point management table is:

$$28 \text{ (bits)} + 33 \text{ (bits)} = 61 \text{ (bits)} \approx 64 \text{ (bits)} = 8 \text{ (bytes)}.$$

When each GOP has a reproduction time of about 0.5 seconds and the I-picture in each GOP is an access point, there are 172,800 access points (=60 (seconds)×60 (minutes)×24 (hours)/0.5 (seconds)) in a stream having twenty-four hours of reproduction time. Therefore, in order to provide an eight-byte access point management table entry for each access point, the following amount of information is necessary.

$$172{,}800 \text{ (access points)} \times 8 \text{ (bytes)} \approx 1.38 \text{ MB (megabytes)}$$

Therefore, for a PIP stream including two multiplexed video streams, if each video stream were to have a separate access point management table, the following amount of information would be necessary.

1.38 (MB)×2 (video streams)=2.76 MB

In the optical disc 102 in the first embodiment, however, the plurality of video data streams multiplexed in a PIP stream do not need to have separate access point management tables. The amount of information needed to retrieve I-pictures from the PIP stream can therefore be significantly reduced.

Second Embodiment

In the first embodiment, the relative number of packets from the start of an access point is recorded in 'I_Pic_Size' 503, and the relative number of packets from the packet immediately following the packet corresponding to 'I_Pic_Size' 503 is recorded in 'I_Pic_Size_Sub' 1200. In the second embodiment, the information recorded in 'I_Pic_Size' 503 and 'I_Pic_Size_Sub' 1200 differs from that in the first embodiment. In the following description, explanations of matters explained in the first embodiment will be omitted.

FIG. 15 (A), FIG. 15 (B), and FIG. 15 (C) are explanatory diagrams showing other examples of the information recorded in 'I_Pic_Size' 503 and 'I_Pic_Size_Sub' 1200. FIG. 15 (A) schematically illustrates the relationship between a PIP stream 410 and the 'I_Pic_Size' 503 and 'I_Pic_Size_Sub' 1200 described in the first embodiment. FIG. 15 (B) schematically illustrates the relationship between the PIP stream 410 and the 'I_Pic_Size' 503 and 'I_Pic_Size_Sub' 1200 in the second embodiment.

As explained above, in the first embodiment the relative number of packets from the start of an access point is recorded in 'I_Pic_Size' 503, and the relative number of packets from the packet immediately following the packet corresponding to 'I_Pic_Size' 503 is recorded in 'I_Pic_Size_Sub' 1200. In FIG. 15 (A), the 'I_Pic_Size' 503 recorded in the access point management table is '13 (packets)', which is the number of packets from the V_main packet corresponding to 'SPN_GOP_Start' 502 to the last V_main packet among the V_main packets constituting the M_I-picture. The 'I_Pic_Size_Sub' 1200 is '6 (packets)', which is the number of packets from the V_sub packet immediately following the last V_main packet among the V_main packets constituting the M_I-picture to the last V_sub packet among the V_sub packets constituting the S_I-picture.

In FIG. 15 (B), a size ID representing the number of packets from the V_main packet corresponding to 'SPN_GOP_Start' 502 to the last V_main packet among the V_main packets constituting the M_I-picture is recorded as 'I_Pic_Size' 503 in an access point management table similar to the one in FIG. 11 (B). Another size ID, representing the number of packets from the packet immediately following the packet corresponding to the maximum number of packets corresponding to the size ID of 'I_Pic_Size' 503 to the last V_sub packet among the V_sub packets constituting the S_I-picture, is recorded as 'I_Pic_Size_Sub' 1200.

A more concrete description will now be given. The I-picture size table 1500 shown in FIG. 15 (C) is pre-stored in the memory unit 120 or other memory means (not shown) in the reproducing apparatus 100. The I-picture size table 1500 is a table that relates the size IDs to numbers of packets pre-defined as 'I_Pic_Size'. For example, the relation in the I-picture size table 1500 shown in FIG. 15 (C) assigns 0 packets to size ID '0', 1 to 5 packets to size ID '1', 6 to 10 packets to size ID '2', 11 to 15 packets to size ID '3', 16 to 20 packets to size ID '4', 21 to 25 packets to size ID '5', 26 to 30 packets to size ID '6', and 31 or more packets to size ID '7'.

In the access point management table, which is similar to the one shown in FIG. 11 (B), the size ID with the range including the number of packets from the V_main packet corresponding to 'SPN_GOP_Start' 502 to the last V_main packet among the V_main packets constituting the M_I-picture is calculated with reference to the I-picture size table 1500 and recorded as 'I_Pic_Size' 503. The size ID with the range including the number of packets from the packet immediately following the maximum number of packets corresponding to the size ID of 'I_Pic_Size' 503 to the last V_sub packet among the V_sub packets constituting the S_I-picture is calculated with reference to the I-picture size table 1500 and recorded as 'I_Pic_Size_Sub' 1200.

For example, in FIG. 15 (B), since the number of packets corresponding to 'I_Pic_Size' 503 in FIG. 15 (A) is '13 (packets)', the size ID '3' is recorded in 'I_Pic_Size' 503 in the second embodiment. However, although the number of packets corresponding to 'I_Pic_Size_Sub' 1200 is '6 (packets)', the size ID recorded in 'I_Pic_Size_Sub' 1200 in FIG. 15 (B) is not '2'. A specific explanation will be given next.

The sum of the number of packets corresponding to the M_I-picture and the number of packets corresponding to the S_I-picture is '19(=13+6)'. As size ID '3' is recorded in 'I_Pic_Size' 503, however, fifteen of these nineteen packets will be read from the optical disc 102. The size ID recorded as 'I_Pic_Size_Sub' 1200 only has to cause four packets to be read from the optical disc 102. In FIG. 15 (B), accordingly, the size ID '1' is recorded as 'I_Pic_Size_Sub' 1200.

Next, the operation of the reproducing apparatus 100 in a trick reproduction mode in the second embodiment will be described. In the following description, explanations of operations explained in the first embodiment will be omitted; only operations different from those in the first embodiment will be described. The system control unit 101 acquires information ('SPN_GOP_Start' 502, 'I_Pic_Size' 503, 'I_Pic_Size_Sub' 1200) about the access point closest to the point on the PIP stream being reproduced at the selection instant.

Based on the acquired 'PTS_GOP_Start' 501 and 'SPN_GOP_Start' 502, the system control unit 101 detects the first V_main packet among the V_main packets constituting the M_I-picture corresponding to the entry point to be accessed next. The system control unit 101 acquires the size ID recorded in 'I_Pic_Size' 503 (referred to below as the first size ID) and the size ID recorded in 'I_Pic_Size' 503 (referred to below as the second size ID). With reference to the I-picture size table 1500, the system control unit 101 calculates the sum (also referred to below as the total number of packets) of the maximum number of packets corresponding to the first size ID (e.g., 15 packet if this size ID is '3'), and the maximum number of packets corresponding to the second size ID. For example, in FIG. 15 (B), the system control unit 101 adds '15 (packets)', the maximum number of packets corresponding to the first size ID, and '5 (packets)', the maximum number of packets corresponding to the second size ID, to find that twenty packets must be read from the optical disc 102.

If the second size ID is '0', only the packets indicated by the first size ID need be read from the optical disc 102. This is because when the second size ID is '0', the range of packets indicated by the first size ID includes all the V-packets constituting the sub video I-picture.

The system control unit 101 controls the reproducing drive unit 103 to read the number of packets indicated by the total number of packets, starting from the packet corresponding to 'SPN_GOP_Start' 502. The reproducing drive unit 103 reads the packets from the optical disc 102 as directed by the system control unit 101, thereby reading all the V_main packets of the M_I-picture and all the V_sub packets of the S_I-picture. In FIG. 15 (B), for example, the reproducing drive unit 103 reads twenty packets, which is the sum of the maximum number of packets corresponding to the first size ID (15 packets) and the maximum number of packets corresponding to the second size ID (5 packets), starting from the packet corresponding to 'SPN_GOP_Start' 502.

As described above, in the optical disc 102 according to the second embodiment, 'I_Pic_Size' 503 and 'I_Pic_Size_Sub' 1200 are specified by using size IDs. The amount of information in the access point management table is therefore less than in the first embodiment. The amount of information necessary to retrieve an M_I-picture and an S_I-picture can be substantially the same as usual.

Whether to use the access point management table in the first embodiment or the access point management table in the second embodiment in an optical disc 102 can be determined, for example, as follows.

In the access point management table in the first embodiment, the actual number of packets is recorded in 'I_Pic_Size' 503 and 'I_Pic_Size_Sub' 1200. Therefore, the system control unit 101 can detect the precise range in which packets (V_main packets and V_sub packets) corresponding I-pictures are present in the PIP stream. The computational load on the system control unit 101 can therefore be reduced, because the processing performed by the system control unit 101 is minimized.

In the access point management table in the second embodiment, size IDs are recorded in 'I_Pic_Size' 503 and 'I_Pic_Size_Sub' 1200. The system control unit 101 therefore detects an approximate range in which packets (V_main packets and V_sub packets) corresponding to I-pictures are present in the PIP stream. The system control unit 101 must accordingly process a few more packets than the minimum necessary number. However, the amount of information in the access point management table in the second embodiment is smaller than in the first embodiment.

Therefore, if a reduction in computational load on the system control unit 101 is desired, the access point management table of the first embodiment may be adopted, and if a reduction in the area in the optical disc 102 necessary to record the access point management tables is preferable in order to save space for other information on the optical disc 102, the access point management table of the second embodiment may be employed.

In a PIP display of the type in FIG. 10 (B) or (C), as described in the first or second embodiment, an M_I-picture and an S_I-picture must be displayed simultaneously (at the same time). Therefore, the PTS indicating the starting display time of the M_I-picture and the PTS indicating the starting display time of the S_I-picture have identical values (condition 1). The first V_sub packet in the V_sub packets constituting the S_I-picture is detected from 'I_Pic_Size' 503. 'I_Pic_Size' 503 is set with reference to 'SPN_GOP_Start' 502.

The packets are arranged so that the first of the V_sub packets constituting the S_I-picture is always located after the first of the V_main packets constituting the M_I-picture. If the number of packets from the first packet in the PIP stream to the first of the V_sub packets constituting the S_I-picture is SPNS, and the number of packets from the start of the PIP stream to the first of the V_main packets constituting the M_I-picture is SPNM, then the packets are arranged so that SPNS>SPNM (condition 2). By arranging packets to satisfy conditions 1 and 2 above, a PIP display can be performed with one stream.

Third Embodiment

In the first embodiment, a case was described in which the V_main packets in the main video stream and the V_sub packets in the sub video stream were detected for trick reproduction during a PIP display (FIG. 10 (B) or (C)). In the case to be described in the third embodiment, only the V_sub packets in the sub video stream are detected and only the sub video image is displayed (FIG. 10 (D)). In the following description, explanations of matters explained in the first and second embodiments will be omitted. In the drawings referred to in the following description, the unexplained elements are indicated by the same reference characters as in the drawings referred to in the descriptions of the first and second embodiments.

FIG. 16 is an explanatory diagram depicting the data structure of a stream information file 231 in which a PIP stream is stored and the data structure of the address management file 222 corresponding to the PIP stream according to the third embodiment. As shown in FIG. 16, the access point management table 1610 recorded in the address management file 222 according to the third embodiment has an 'I_Start_Sub' column 1600 in which the number of packets from the V_main packet corresponding to 'SPN_GOP_Start' 502 to the first V_sub packet among the V_sub packets constituting the S_I-picture is recorded.

Therefore, all V_sub packets constituting the S_I-picture are included in a range from the packet corresponding to 'SPN_GOP_Start' 502 to the packet identified by the number of packets equal to the sum of the number of packets recorded in 'I_Pic_Size' 503 and the number of packets recorded in 'I_Pic_Size_Sub' 1200, excluding the range from the packet corresponding to 'SPN_GOP_Start' 502 to the packet identified by the number of packets recorded in 'I_Start_Sub' 1600.

FIG. 17 is an explanatory diagram of the syntax of the access point management table 1610 in the third embodiment. The loop statement (for(M=1 . . . ){ . . . }) following 'I_Pic_Size' 503 is repeated {(value recorded in 'num_of_video' 500)−1} times for each access point. By execution of the loop statement, 'I_Pic_Size_Sub' 1200 and 'I_Start_Sub' 1600 are detected as many times as the number of sub video data streams stored in the stream information file 231. In 'I_Pic_Size_Sub' 1200, the relative number of packets from the V_sub packet immediately following the V_main packet indicated by 'I_Pic_Size' 503 is recorded as information indicating the position of the last V_sub packet among the V_sub packets constituting the S_I-picture. In 'I_Start_Sub' 1600, the relative number of packets from the V_main packet indicated by 'SPN_GOP_Start' 502 is recorded as information indicating the position of the first V_sub packet among the V_sub packets constituting the S_I-picture.

Figure 18:
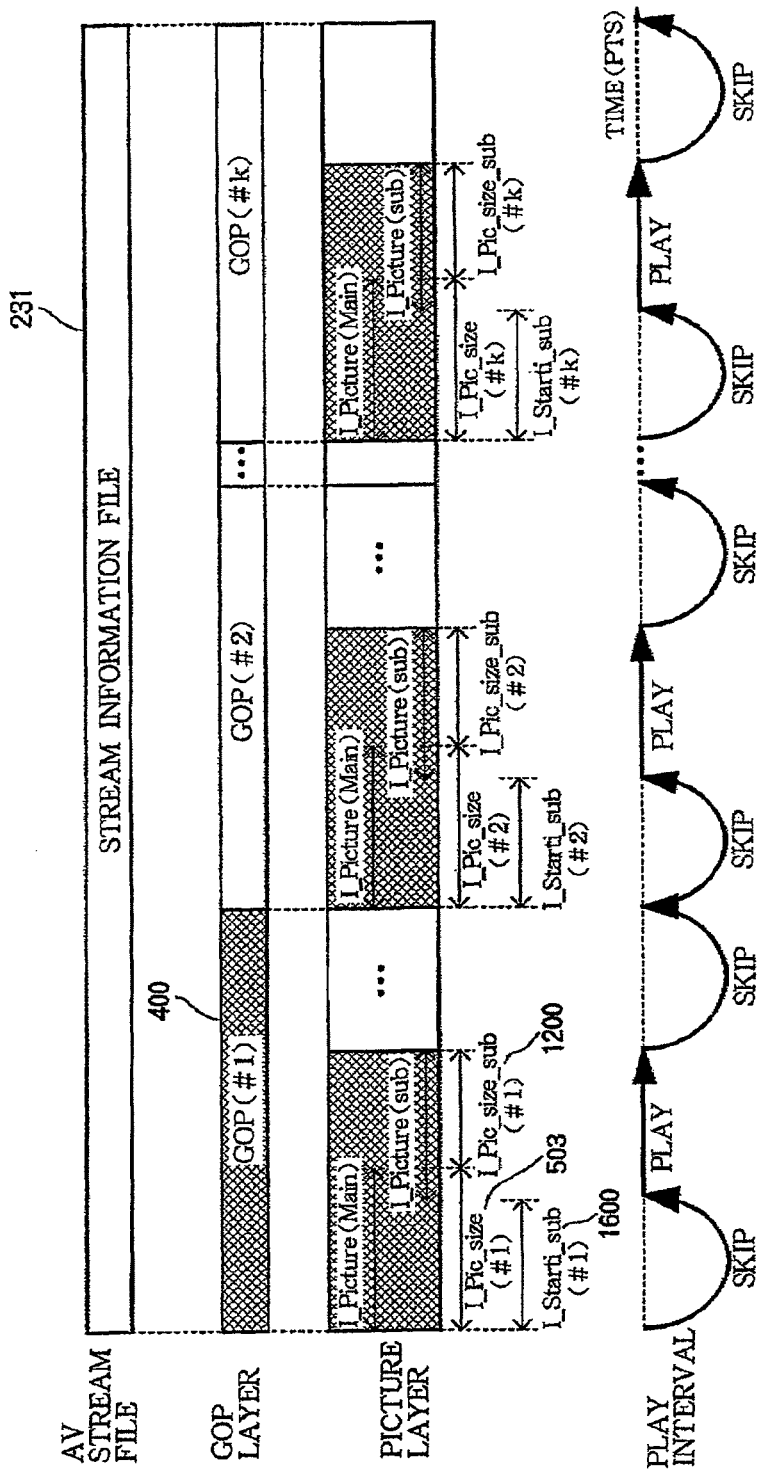
FIG. 18 is an explanatory diagram depicting trick reproduction based on the access point management table 1610.

FIG. 18 is an explanatory diagram depicting trick reproduction based on the access point management table 1610 described in FIG. 17. In the picture layer of FIG. 18, 'I_Picture(Main)' represents a main video I-picture, and 'I_Picture (Sub)' represents a sub video I-picture. Trick reproduction of the PIP stream as in the display shown in FIG. 10 (D) can be accomplished by intermittently reading the S_I-pictures of the sub video stream from the optical disc 102.

Specifically, 'PTS_GOP_Start' and 'SPN_GOP_Start' are used to detect the first of the V_main packets constituting the M_I-picture (also referred to below as the leading V_main packet). 'I_Pic_Size' 503 is used to detect the last of the V_Main packets constituting the M_I-picture (also referred to below as the terminal V_main packet). 'I_Pic_Size_Sub' 1200 is used to detect the last of the V_sub packets constituting the S_I-picture (also referred to as the terminal V_sub packet). 'I_Start_Sub' 1600 is used to detect the first of the V_sub packets constituting the S_I-picture (also referred to below as the leading V_sub packet). The packets from the leading V_sub packet detected by 'I_Start_Sub' 1600 to the terminal V_sub packet detected by the 'I_Pic_Size_Sub' 1200 are read from the optical disc 102. The packets in the minimum range necessary for reading the V_sub packets constituting the S_I-picture can thereby be obtained. By execution of the above process for each access point, trick reproduction can be performed by repeatedly reproducing the S_I-pictures and skipping the other pictures, as shown in FIG. 18.

Next, the operation of the reproducing apparatus 100 in trick reproduction of a PIP stream displayed as shown in FIG. 10 (D) will be described. In the following description, explanations of operations explained in the first embodiment will be omitted; only operations different from those in the first embodiment will be described. The system control unit 101 acquires information ('PTS_GOP_Start' 501, 'SPN_GOP_Start' 502, 'I_Pic_Size' 503, 'I_Pic_Size_Sub' 1200 and 'I_Start_Sub' 1600) about the access point closest to the point on the PIP stream being reproduced at the selection time.

From the acquired 'PTS_GOP_Start' 501 and 'SPN_GOP_Start' 502, the system control unit 101 detects the first V_main packet among the V_main packets constituting the M_I-picture corresponding to the entry point to be accessed next. From 'I_Pic_Size' 503, the system control unit 101 detects the last V_main packet among the V_main packets constituting this M_I-picture. From 'I_Pic_Size_Sub' 1200, the system control unit 101 detects the last V_sub packet among the V_sub packets constituting the S_I-picture. From 'I_Start_Sub' 1600, the system control unit 101 detects the first V_sub packet among the V_sub packets constituting the S_I-picture.

The system control unit 101 now controls the reproducing drive unit 103 to read the packets in the range containing all the V_sub packets of the S_I-picture, from the leading V_sub packet to the terminal V_sub packet, from the optical disc 102. The reproducing drive unit 103 reads the V-packets from the optical disc 102 as directed by the system control unit 101. Specifically, the reproducing drive unit 103 reads the V-packets (V_main packets and V_sub packets) included in the range from the V_sub packet indicated by 'I_Start_Sub' 1600 to the V_sub packet indicated by 'I_Pic_Size_Sub' 1200 in the PIP stream, all at once.

As described above, with the optical disc 102 in the third embodiment, in a trick reproduction mode in which only the sub video image is displayed, as shown in FIG. 10 (D), the V_sub packets necessary for displaying the sub video image can be detected and read out rapidly.

With the access point management table according to the first or second embodiment, all V_main packets constituting the M_I-picture and all V_sub packets constituting the S_I-picture are read from the optical disc 102 at once. However, when only the sub video image is displayed, the V_main packets are not required. Therefore, when only the sub video image is displayed, simultaneous reading of V_sub packets and V_main packets imposes unnecessary processing on the system control unit 101, resulting in an increased computational load on the system control unit 101.

The overall operation of the reproducing apparatus is hence delayed, which makes rapid trick reproduction of the sub video difficult. Therefore when only the sub video is displayed, at a minimum, all the V_sub packets necessary for display of the sub video must be read, but as far as possible, V_main packets should not be read. The optical disc 102 according to the third embodiment can satisfy these requirements with a simple structure.

Although the above operations are performed for each access point in the description above, in n-fold high-speed reproduction (where n is an integer or non-integer greater than zero), which is one type of trick reproduction, some of the access points processed as above can be skipped, according to the value of n.

Fourth Embodiment

Although the third embodiment was described above as recording the actual number of packets in 'I_Pic_Size' 503, 'I_Pic_Size_Sub' 1200, and 'I_Start_Sub' 1600 in, an I-picture size table 1500 can be used in the third embodiment as in the second embodiment. This will now be described specifically. In the following description, explanations of matters explained in the first to third embodiments will be omitted.

FIG. 19 (A), FIG. 19 (B), and FIG. 19 (C) are explanatory diagrams depicting the recording of size IDs in 'I_Pic_Size' 503, 'I_Pic_Size_Sub' 1200, and 'I_Start_Sub' 1600. FIG. 19 (A) schematically illustrates the relationship between the PIP stream 410 and the 'I_Pic_Size' 503, 'I_Pic_Size_Sub' 1200, and 'I_Start_Sub' 1600 described in the third embodiment. FIG. 19 (B) schematically illustrates the relationship between the PIP stream 410 and the 'I_Pic_Size' 503, 'I_Pic_Size_Sub' 1200, and 'I_Start_Sub' 1600 in the fourth embodiment.

In FIG. 19 (A), the 'I_Pic_Size' 503 recorded in the access point management table is '13 (packets)', which is the number of packets from the V_main packet corresponding to 'SPN_GOP_Start' 502 to the last V_main packet among the V_main packets constituting the M_I-picture. The 'I_Pic_Size_Sub' 1200 is '6 (packets)', this being the number of packets from the V_main packet immediately following the last V_main packet among the V_main packets constituting the M_I-picture to the last V_sub packet among the V_sub packets constituting the S_I-picture. The 'I_Start_Sub' 1600 is '9 (packets)', which is the number of packets from the V_main packet corresponding to 'SPN_GOP_Start' 502 to the first V_sub packet among the V_sub packets constituting the S_I-picture.

In FIG. 19 (B), a size ID representing the number of packets from the V_main packet corresponding to 'SPN_GOP_Start' 502 to the last V_main packet among the V_main packets constituting the M_I-picture is recorded as 'I_Pic_Size' 503 in the access point management table. Another size ID, representing the number of packets from the packet immediately following the packet corresponding to the maximum number of packets corresponding to the size ID of 'I_Pic_Size' 503 to the last V_sub packet among the V_sub packets constituting the S_I-picture, is recorded as 'I_Pic_Size_Sub' 1200. Yet another size ID, representing the number of packets from the packet corresponding to 'SPN_GOP_Start' 502 to the first V_sub packet among the V_sub packets constituting the S_I-picture, is recorded as 'I_Start_Sub' 1600.

In FIG. 15 (B), since the number of packets corresponding to 'I_Pic_Size' 503 is '13 (packets)', the size ID '3' is recorded in 'I_Pic_Size' 503 in the fourth embodiment. The number of packets corresponding to 'I_Pic_Size_Sub' 1200 is '6 (packets)' in FIG. 15 (A), but since size ID '3' is recorded in 'I_Pic_Size' 503, fifteen of these nineteen packets will be read from the optical disc 102. The size ID recorded as 'I_Pic_Size_Sub' 1200 only has to cause four packets to be read from the optical disc 102. In FIG. 15 (B), accordingly, the size ID '1' is recorded as 'I_Pic_Size_Sub' 1200. Since the number of packets corresponding to 'I_Start_Sub' 1600 in FIG. 19 (A) is '9 (packets)', the size ID '2' is recorded as 'I_Start_Sub' 1600.

Next, the operation of the reproducing apparatus 100 in a trick reproduction mode will be described. In the following description, explanations of operations explained in the first to third embodiments will be omitted; only different operations will be described.

From 'PTS_GOP_Start' 501 and 'SPN_GOP_Start' 502, the system control unit 101 detects the first V_main packet among the V_main packets constituting the M_I-picture corresponding to the entry point to be accessed next. The system control unit 101 acquires a first size ID recorded in 'I_Pic_Size' 503, a second size ID recorded in 'I_Pic_Size_Sub' 1200, and a size ID recorded in 'I_Start_Sub' 1600 (referred to below as the third size ID). With reference to the I-picture size table 1500 as above, the system control unit 101 calculates the sum (also referred to below as the total number of packets) of the maximum number of packets corresponding to the first size ID (e.g., 15 packets when this size ID is '3') and the maximum number of packets corresponding to the second size ID.

For example, in FIG. 15 (B), the system control unit 101 adds '15 (packets)', the maximum number of packets corresponding to the first size ID, and '5 (packets)', the maximum number of packets corresponding to the second size ID, to find that among the packets to be read, the terminal packet is located at the twentieth packet position from the V_main packet corresponding to 'SPN_GOP_Start' 502. Also, from the third size ID '2', the system control unit 101 finds that the of the packets to be read, the leading packet is located at the sixth packet position (the minimum number of packets corresponding to the third size ID '2') from the V_main packet corresponding to 'SPN_GOP_Start' 502.

The system control unit 101 controls the reproducing drive unit 103 to read packets from the optical disc 102 from the leading V_sub packet detected by 'I_Start_Sub' 1600 to the terminal V_sub packet detected by 'I_Pic_Size_Sub' 1200.

As described above, in the optical disc 102 according to the fourth embodiment, the amount of information in the access point management table can be reduced by recording size IDs in 'I_Pic_Size' 503, 'I_Pic_Size_Sub' 1200, and 'I_Start_Sub' 1600. In particular, the amount of information needed to retrieve S_I-pictures can be reduced, as compared with the third embodiment.

Whether to use the access point management table in the third embodiment or the access point management table in the fourth embodiment in the optical disc 102 can be determined in the same manner as whether to use the access point management table in the first embodiment or the access point management table in the second embodiment was determined.

Although only I-pictures were described as being reproduced in the trick reproduction modes in the first to fourth embodiments, P-pictures as well as I-pictures may be reproduced during trick reproduction. A smoother reproduced video image (display) can be obtained by performing trick reproduction using both I-pictures and P-pictures. If P-pictures are used, the information recorded in the access point management tables described in the first to fourth embodiments is similarly provided for P-pictures. Specifically, the position of the first packet among the V-packets constituting a P-picture may be expressed by a relative number of packets from the last V-packet constituting the I-picture.

Although the first to fourth embodiments were described as using GOPs defined in the MPEG-2 standard, the subject matter described in the first to fourth embodiments is applicable whenever access points are constructed from compression units begin with an I-picture. Therefore, the invention can be applied to streams generated according to other coding and compression methods, such as MPEG-4 or VC-1.

What is claimed is:

1. A playback method for reproducing a video information stream recorded on a medium, said video information stream comprising a plurality of video information units each of which includes an intra coded I-picture, a predictive coded P-picture and a bidirectionally-predictive coded B-picture, said video information stream including a first video information stream representing a primary video sequence, a second video information stream representing secondary video sequence which is presented with said primary video sequence and an access point map which includes access point information and I-picture size information of said first video information stream and said second video information stream, said first video information stream and said second video information stream including a plurality of packets;

said method comprising steps of:
identifying a closest one of I-pictures preceding a start picture corresponding to a start point of playback for said first video information stream and a second video information stream;
locating a position of identified I-picture for said first video information stream and said second video information stream by referring to said access point map, and said access point information indicating a number of said packets;
recognizing a data size of identified I-picture for said first video information stream and said second video information stream by referring to said access point map, and said I-picture size information representing a range of I-picture size;
decoding said identified I-picture for said first video information stream and said second video information stream; and
decoding said start picture using decoded I-picture as a reference picture for said first video information stream and said second video information stream.

2. A recording method for recording a video information stream on a medium, said video information stream comprising a plurality of video information units each of which includes an intra coded I-picture, a predictive coded P-picture and a bidirectionally-predictive coded B-picture, said video information stream including a first video information stream representing a primary video sequence, a second video information stream representing secondary video sequence which is presented with said primary video sequence and an access point map which includes access point information and I-picture size information of said first video information stream and said second video information stream, and said first video information stream and said second video information stream including a plurality of packets, comprising;

a processor that processes the video information stream and records the video information stream on a designated location of said medium,
wherein during playback a closest one of I-pictures preceding a start picture corresponding to a start point of playback for said first video information stream and a second video information stream is identified, and a position located and a data size recognized of identified I-picture for said first video information stream and said second video information stream by referring to said access point map, said access point information indicates a number of said packets, and said I-picture size information represents a range of I-picture size.

* * * * *